United States Patent
Miyauchi

(10) Patent No.: US 7,287,136 B2
(45) Date of Patent: Oct. 23, 2007

(54) CACHE DEVICE, AND METHOD AND COMPUTER PROGRAM FOR CONTROLLING CACHED DATA

(75) Inventor: Tsutomu Miyauchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 227 days.

(21) Appl. No.: 10/520,427

(22) PCT Filed: Jun. 24, 2003

(86) PCT No.: PCT/JP03/07971

§ 371 (c)(1),
(2), (4) Date: Mar. 28, 2005

(87) PCT Pub. No.: WO2004/006101

PCT Pub. Date: Jan. 15, 2004

(65) Prior Publication Data

US 2005/0172080 A1    Aug. 4, 2005

(30) Foreign Application Priority Data

Jul. 4, 2002    (JP)    ............................. 2002-195654

(51) Int. Cl.
*G06F 12/02* (2006.01)
(52) U.S. Cl. ...................... 711/160; 711/159
(58) Field of Classification Search ............... None
See application file for complete search history.

(56) References Cited

U.S. PATENT DOCUMENTS 6,073,129 A * 6/2000 Levine et al. ................ 707/4
7,136,885 B2 * 11/2006 Wright, Jr. et al. ......... 707/205

FOREIGN PATENT DOCUMENTS

| JP | 10-222411 | 8/1998 |
| JP | 2001-202330 | 7/2001 |
| JP | 2002-149477 | 5/2002 |

* cited by examiner

*Primary Examiner*—T Nguyen
(74) *Attorney, Agent, or Firm*—Bell, Boyd & Lloyd LLP

(57) ABSTRACT

A cache device and a method for controlling cached data that enable efficient use of a storage area and improve the hit ratio are provided. When cache replacement is carried out in cache devices connected to each other through networks, data control is carried out so that data blocks set to a deletion pending status in each cache device, which includes lists regarding the data blocks set to a deletion pending status, in a cache group are different from those in other cache devices in the cache group. In this way, data control using deletion pending lists is carried out. According to the system of the present invention, a storage area can be used efficiently as compared with a case where each cache device independently controls cache replacement, and data blocks stored in a number of cache devices are collected to be sent to terminals in response to data acquisition requests from the terminals, thereby facilitating network traffic and improving the hit rate of the cache devices.

14 Claims, 21 Drawing Sheets

(a)

| 0 1 2 3 4 5 6 7 | 8 9 0 1 2 3 4 5 | 6 7 8 9 0 1 2 3 4 5 6 7 8 9 0 1 |
|---|---|---|
| OPCODE | VERSION | MESSAGE LENGTH |
| REQUEST NUMBER ||| 
| OPTIONS |||
| OPTION DATA |||
| SENDER HOST ADDRESS |||
| PAYLOAD |||

(b)

| REQUEST HOST ADDRESS |
|---|
| NULL-TERMINATED URL |

FIG. 5

| HOST NAME | IP ADDRESS | ICP PORT NUMBER |
|---|---|---|
| cache1.home1.com | xx.yy.zz.a1 | 3130 |
| cache2.home2.com | xx.yy.zz.a2 | 3130 |
| cache3.home3.com | xx.yy.zz.a3 | 3130 |
| ------------------ | ------------------ | ------------------ |

FIG. 6

| 0 1 2 3 4 5 6 7 8 9 0 1 2 3 4 5 6 7 8 9 0 1 2 3 4 5 6 7 8 9 0 1 |
|---|
| REQUEST HOST ADDRESS |
| NULL-TERMINATED CONTENT IDENTIFIER |
| NUMBER OF MEMBER (N) | MEMBER NUMBER (m) | GROUP ID |
| CACHE MEMBER #1 IP ADDRESS |
| CACHE MEMBER #2 IP ADDRESS |
| CACHE MEMBER #3 IP ADDRESS |
| CACHE MEMBER #4 IP ADDRESS |
| ------ |
| CACHE MEMBER #N IP ADDRESS |

FIG. 7

| TARGET CONTENT DATA IDENTIFIER | NUMBER OF GROUP MEMBERS (N) | GROUP ID | GROUP MEMBER LIST | |
|---|---|---|---|---|
| | | | MEMBER NUMBER (m) | IP ADDRESS |
| 12345678 | 4 | 231 | 1<br>2<br>3<br>4 | xx.yy.zz.a1<br>xx.yy.zz.a2<br>xx.yy.zz.a3<br>xx.yy.zz.a4 |
| 34567890 | 3 | 232 | 1<br>2<br>3 | xx.yy.zz.b1<br>xx.yy.zz.b2<br>xx.yy.zz.b3 |
| ......... | ......... | ......... | ......... | ......... |

FIG. 8

CACHE DEVICE, AND METHOD AND COMPUTER PROGRAM FOR CONTROLLING CACHED DATA

CROSS REFERENCES TO RELATED APPLICATIONS

The present application claims priority to Japanese Patent Document No. P2002-195654 filed on Jul. 4, 2002, the disclosure of which is herein incorporated by reference.

BACKGROUND OF THE INVENTION

The present invention relates to cache devices, and to methods and computer programs for controlling cached data and, in particular, relates to a cache device, and to a method and a computer program for controlling cached data that enable efficient use of a data storage area in the cache device and that improve the hit ratio in cacheing data that is sent and received through networks.

Recently, a large amount of image and voice data, various types of programs, and the like has been transmitted through networks such as the Internet. The types of content transmitted through networks, which include text and still images, have extended to multimedia content such as moving images and voice, so that the volume and types of content have increased considerably.

Large-volume content delivery through broadband networks has rapidly increased. Accordingly, the amount of content that is delivered through networks has rapidly increased. When the types of content increase and large-volume content increases, data communication volume disadvantageously increases; that is, data traffic in networks increases.

One method for solving the problem of increased data traffic in networks is a cache system. A cache system includes caches functioning as data storage areas on network paths extending from a content delivery site to users that receive the content. When user-requested data (content) is stored in the caches, the data (content) is not sent from the content delivery site, but instead is retrieved from the caches and sent to the users.

When, for example, a user retrieves content through networks and the content is stored in a temporary storage device (cache) on the networks, the cache stores and deletes the content according to predetermined rules. For example, infrequently accessed content in the cache is replaced every time up-to-date content is input to the cache up to the storage capacity of the cache. In general, these rules for controlling the content of the cache are, in effect, independent of direct controls by both the content delivery side and the user side.

In controlling a data area of an Internet cache in this way, when data occupies the full space of the data area, an inactive region of the data area is detected and the data in the inactive region is deleted and replaced with up-to-date data. This process is called cache replacement.

In known cache replacement in an Internet cache, when a number of caches exist in networks such as the Internet, independent data control is generally carried out in each cache device. The most common cache replacement method is a data control method using the least recently used (LRU) algorithm.

The LRU algorithm is a control method registering a data block that has not been used recently at the end of an LRU list and registering a data block that has been used recently at the head of the LRU list. In this method, when old data is deleted to cache new data, a new data storage area is secured by deleting the data block registered at the end of the LRU list.

Referring to FIG. 1, the data control method using the LRU algorithm will now be described. The data used in the control are an LRU list (a) having entries, in the order of usage frequency, corresponding to individual data blocks, and a free block list (b) indicating free area blocks in a cache. Newly cached data is stored in a data storage block, serving as a memory region, which is pointed to by a pointer indicated in each entry of the free block list (b). An entry that stores block information of the data storage block is registered as a head entry 101 in the LRU list (a).

When some of the previous cached data is deleted because the data storage area of the cache is fully occupied by inputting (caching) the new data, a data block that has not been used recently, corresponding to an entry 102 at the end of the LRU list (a), is deleted. A certain data storage block is registered as a free area by registering an entry indicating pointer information of the deleted data block in the free block list (b).

The above method for controlling data blocks for a cache is applied using information of a single cache device. A method for requesting data that does not reside in a requesting cache device to a number of neighboring cache devices has been proposed as the Internet Cache Protocol (ICP: Requests for Comments RFC-2186, RFC-2187). In this method, the data request process is carried out, specifying a uniform resource locator (URL) serving as resource information of a content file, for each URL, wherein there is no function that minutely adjusts which data of a number of caches is deleted or kept. Thus, the requested data is simply retrieved from other cache devices instead of being downloaded from a server when the same data as the requested data happens to remain in the other cache devices as a result of respective operations of these cache devices.

SUMMARY OF THE INVENTION

To solve the problems in cache control described above, the present invention provides a cache device, and a method and a computer program for controlling cached data that enable efficient use of a data storage area in a system including a number of caches connected to a network.

For example, a data area of a cache device connected to a network is controlled using a deletion pending list that temporarily suspends data deletion, and a data control method suitable for caching a large amount of content, such as video content, is implemented by introducing the concept of a cache group.

A cache group is composed of a number of cache devices connected to a network, and the same content data is controlled in each of a number of disks within the group. The content data is controlled in block units composed of a certain number of data units using a deletion pending list, and parts of the content data in a deletion pending status stored in disks are controlled so as to be different from each other. By adopting this arrangement, the original content data can be restored quickly by collecting the parts of the content data from neighboring cache disks in the cache group when many parts of the content data are deleted by cache replacement. When the content data is small, the same control can be carried out by making an arrangement in which different content set to a deletion pending status is stored in each disk.

A first embodiment of the present invention provides a cache device for storing data received through a network as cached data and retrieving the cached data in response to a data request from a terminal to send the cached data to the terminal, the cache device including:

a cache group table including group configuration information regarding a cache group composed of the cache device and other cache devices connected to the network, collaborative content control being carried out for the cache group; and a controller for determining which data blocks are in a deletion pending status, the data blocks being data stored in the cache device, out of data blocks composing content based on the information included in the cache group table, and for controlling the data blocks in the deletion pending status according to a deletion pending list composed of entries including information corresponding to the data blocks in the deletion pending status.

An embodiment of the cache device according to the present invention provides a cache device in which the cache group table includes an identifier of the content that is collaboratively controlled by the cache group, the number N of cache devices of the cache group, and group member numbers m assigned to respective cache devices; and the controller determines which data blocks are in a deletion pending status, the data blocks being stored in the cache device, out of the data blocks composing the content, which is collaboratively controlled; that is, the controller carries out the following process based on a block offset number C serving as offset information, of a data block subjected to the determination, from the leading data block of the content to which the data block belongs:

C mod N is calculated;
V=N when C mod N=0, and
V=(C mod N) when C mod N≠0; and
whether V=m is judged, and
the data block in question is judged to be one of the data blocks in the deletion pending status when V=m.

An embodiment of the cache device according to the present invention provides a cache device in which: the controller judges, by exchanging messages between the cache devices, whether the collaborative control by the cache group is applicable to a data block corresponding to an entry to be removed from an LRU list serving as a list for controlling data blocks stored in storage areas; and the controller generates the cache group table upon judging that the collaborative control is applicable.

An embodiment of the cache device according to the present invention provides a cache device in which: for a data block corresponding to an entry to be removed from an LRU list serving as a list for controlling data blocks stored in storage areas, the controller determines which data blocks are in a deletion pending status, the data blocks being data stored in the cache device, out of the data blocks composing the content based on the information included in the cache group table; and the controller controls the data block, other than the data blocks in the deletion pending status, in a free block list serving as a list for controlling data blocks that can be deleted.

An embodiment of the cache device according to the present invention provides a cache device in which: the deletion pending list includes a number of deletion pending lists corresponding to priority, the data blocks-being stored in order of the priority; and the controller judges the priority at which each of the data blocks is stored, and registers an entry corresponding to the data block subjected to the control in one list selected from the deletion pending lists according to the judgment.

An embodiment of the cache device according to the present invention provides a cache device in which: when the data request from the terminal is for acquiring a data block contained in the content that is collaboratively controlled by the cache group; the controller judges which cache device of the cache group stores the requested data block, and retrieves the data block from the cache device itself or other cache devices of the cache group according to the judgment.

An embodiment of the cache device according to the present invention provides a cache device in which: the cache group table includes an identifier of the content that is collaboratively controlled by the cache group, the number N of cache devices of the cache group, and group member numbers m assigned to respective cache devices; and the controller carries out the following process based on a block offset number C serving as offset information, of the requested data block, from the leading data block of the content to which the data block belongs:

C mod N is calculated;
V=N when C mod N=0, and
V=(C mod N) when C mod N≠0; and
V=m, and the data block is retrieved from a cache device having the group member number m that is calculated.

Another embodiment of the present invention provides a method for controlling cached data in a cache device for storing data received through a network as the cached data and retrieving the cached data in response to a data request from a terminal to send the cached data to the terminal, the method including: a step of determining which data blocks are in a deletion pending status, the data blocks being data stored in the cache device, out of data blocks composing content based on group configuration information, stored in a cache group table, regarding a cache group composed of the cache device and other cache devices connected to the network, collaborative content control being carried out for the cache group; and a step of controlling the data blocks in the deletion pending status according to a deletion pending list composed of entries including information corresponding to the data blocks in the deletion pending status.

An embodiment of the method for controlling cached data according to the present invention provides a method in which: the cache group table includes an identifier of the content that is collaboratively controlled by the cache group, the number N of cache devices of the cache group, and group member numbers m assigned to respective cache devices; and in the step of determining which data blocks are in a deletion pending status, the data blocks in the deletion pending status, the data blocks being stored in the cache device, are determined out of the data blocks composing the content, which is collaboratively controlled; that is, the following process is carried out based on a block offset number C serving as offset information, of a data block subjected to the determination, from the leading data block of the content to which the data block belongs:

C mod N is calculated;
V=N when C mod N=0, and
V=(C mod N) when C mod N≠0; and
whether V=m is judged, and
the data block in question is judged to be one of the data blocks in the deletion pending status when V=m.

An embodiment of the method for controlling cached data according to the present invention provides a method further including: steps of judging, by exchanging messages between the cache devices, whether the collaborative control by the cache group is applicable to a data block corresponding to an entry to be removed from an LRU list serving as a list for controlling data blocks stored in storage areas; and generating the cache group table upon judging that the collaborative control is applicable.

An embodiment of the method for controlling cached data according to the present invention provides a method further including:

a step of determining which data blocks are in a deletion pending status, the data blocks being data stored in the cache device, out of the data blocks composing the content based on the information included in the cache group table for a data block corresponding to an entry to be removed from an LRU list serving as a list for controlling data blocks stored in storage areas; and controlling the data block, other than the data blocks in the deletion pending status, in a free block list serving as a list for controlling data blocks that can be deleted.

An embodiment of the method for controlling cached data according to the present invention provides a method in which the deletion pending list includes a number of deletion pending lists corresponding to priority, the data blocks being stored in order of the priority; with the method further including: steps of judging the priority at which each of the data blocks is stored, and registering an entry corresponding to the data block subjected to the control in one list selected from the deletion pending lists according to the judgment.

An embodiment of the method for controlling cached data according to the present invention provides a method further including: steps of judging which cache device of the cache group stores the requested data block, and retrieving the data block from the cache device itself or other cache devices of the cache group according to the judgment when the data request from the terminal is for acquiring a data block contained in the content that is collaboratively controlled by the cache group.

An embodiment of the method for controlling cached data according to the present invention provides a method in which the cache group table includes an identifier of the content that is collaboratively controlled by the cache group, the number N of cache devices of the cache group, and group member numbers m assigned to respective cache devices; and in the step of retrieving the data block, the following process is carried out based on a block offset number C serving as offset information, of the requested data block, from the leading data block of the content to which the data block belongs:

C mod N is calculated;
V=N when C mod N=0, and
V=(C mod N) when C mod N≠0; and
V=m, and
the data block is retrieved from a cache device having the group member number m that is calculated.

Another embodiment of the present invention provides a computer program for controlling cached data in a cache device for storing data received through a network as the cached data and retrieving the cached data in response to a data request from a terminal to send the cached data to the terminal, the computer program including: a step of determining which data blocks are in a deletion pending status, the data blocks being data stored in the cache device, out of data blocks composing content based on group configuration information, stored in a cache group table, regarding a cache group composed of the cache device and other cache devices connected to the network, collaborative content control being carried out for the cache group; a step of controlling the data blocks in the deletion pending status according to a deletion pending list composed of entries including information corresponding to the data blocks in the deletion pending status.

According to the system of the present invention, when cache replacement is carried out in cache devices connected to each other through a network, data control is carried out so that data blocks set to a deletion pending status in each cache device, which includes lists regarding the data blocks set to a deletion pending status, in a cache group are different from those in other cache devices in the cache group. Thus, a storage area can be used efficiently as compared with a case where each cache independently controls cache replacement, and data blocks stored in a number of cache devices are collected to be sent to terminals in response to data acquisition requests from the terminals, thereby facilitating network traffic and improving the hit rate of the cache devices.

Moreover, when cache devices include multi-level deletion pending lists according to the present invention, the possibility that data stored at high priority is not deleted, but remains, is high, further improvement in the cache hit ratio is achieved.

The computer program according to the present invention can be distributed to, for example, general-purpose computer systems that can execute a variety of program codes, using storage media, such as a compact disc (CD), a floppy disk (FD), and a magnetic optical (MO) disk, and communication media, such as networks, these media being computer-readable. Processing corresponding to the program is performed on the computer systems by distributing the program in computer-readable formats.

Other objects, features, and advantages of the present invention will become apparent from the embodiments of the present invention and detailed description given below, with reference to the attached drawings. The term system referred to in the description means a number of devices that are logically combined, and the devices are not necessarily housed in the same housing.

Additional features and advantages of the present invention are described in, and will be apparent from, the following Detailed Description of the Invention and the Figures.

BRIEF DESCRIPTION OF THE FIGURES

FIG. 5 illustrates a typical format of a send/receive message between cache devices according to the present invention.

FIG. 6 illustrates the data layout of a neighboring cache device list in a cache device according to the present invention.

FIG. 7 illustrates a typical format of a group configuration information message serving as a send/receive message between cache devices according to the present invention.

FIG. 8 illustrates typical data of a cache group table stored in a cache device according to the present invention.

DETAILED DESCRIPTION OF THE INVENTION

Figure 1:
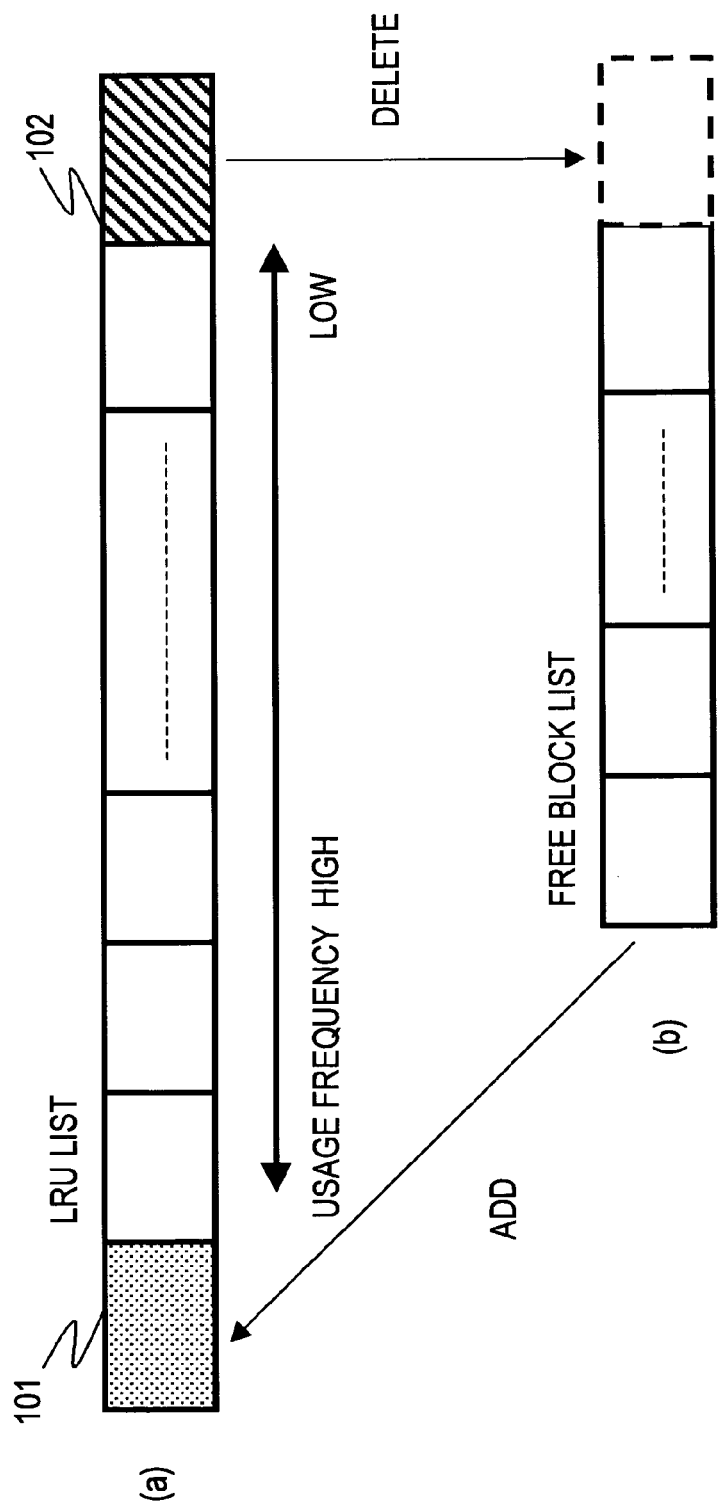
FIG. 1 illustrates known cache data control using an LRU list and a free block list.

Referring to the drawings, cache devices and a method for controlling cached data according to the present invention will now be described in detail.

Figure 2:
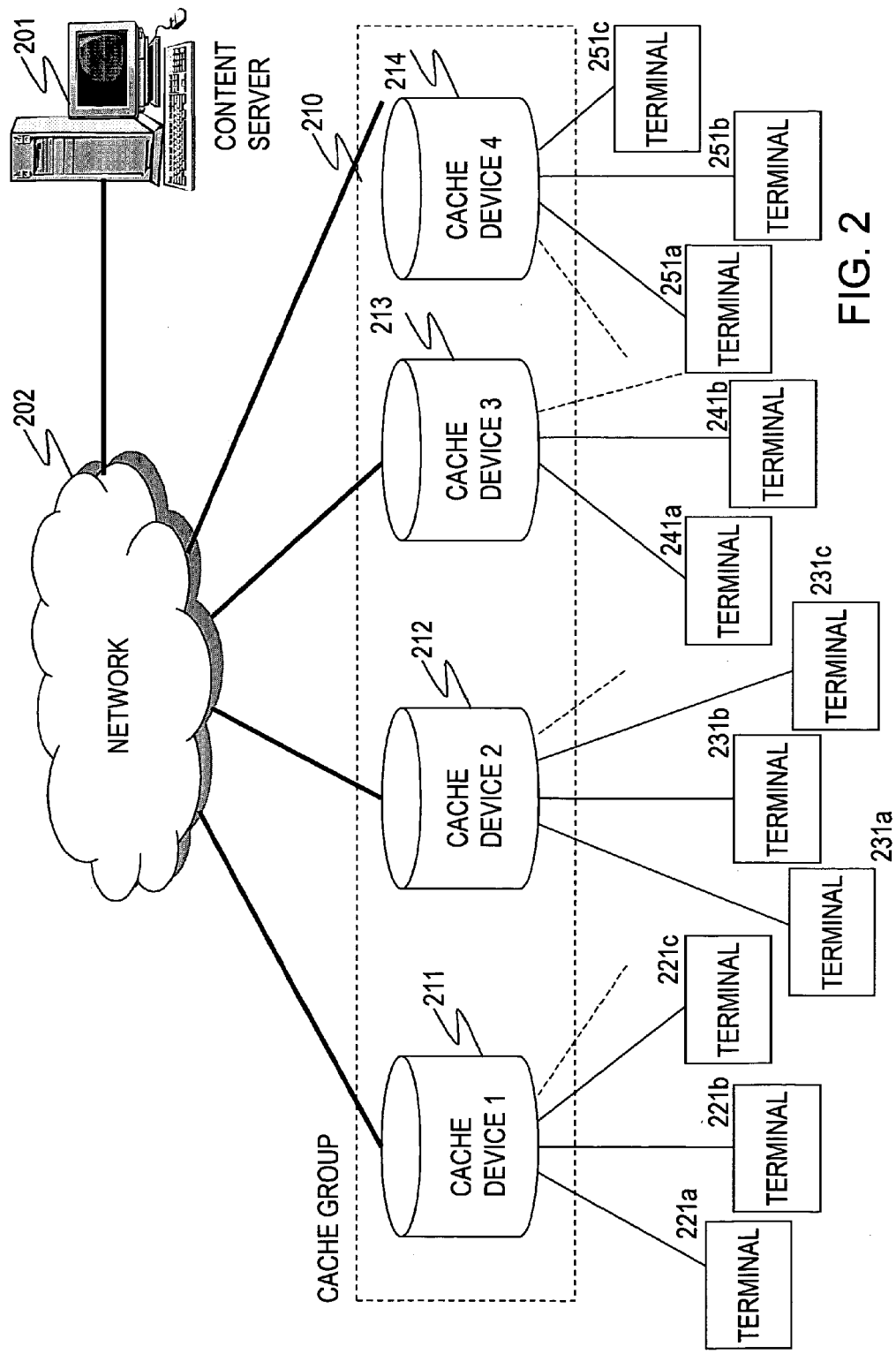
FIG. 2 illustrates a network configuration to which a cache device according to the present invention is applicable.

FIG. 2 illustrates the overall configuration of a typical network to which the cache devices according to the present invention are applicable. The configuration shown in FIG. 2 is similar to that of a system including general Internet cache devices, a server device, and terminal devices. The cache devices according to the present invention are applicable to a known network system configuration. In the network, a number of cache devices are set up as a group, and cached data within the group is controlled.

Cache devices 1 (211) to 4 (214) are connected to each other through the network, and temporarily store data (content) delivered from a content server 201. Terminals that receive the content, such as user personal computers (PCs) and mobile communication terminals, can connect to the network downstream of the cache devices 211 to 214.

Terminals 221a, 221b, 221c, and ... for receiving content connect to the cache device 1 (211). Terminals 231a, 231b, 231c, and ... connect to the cache device 2 (212). Terminals 241a, 241b, and ... connect to the cache device 3 (213). Terminals 251a, 251b, 251c, and ... connect to the cache device 4 (214).

When a terminal submits a request for acquiring content data, the data is read out from the content server 201 or from a cache device between the terminal and the server. A content acquisition request from a terminal is executed, for example, by sending a message for content acquisition request, the message specifying a URL serving as resource information of a content file.

When data corresponding to the URL of the content requested from the terminal is stored in a cache device, the data is read out from the cache device. When the data is read out from the cache device, data transfer between the content server 201 and the cache device can be omitted, thereby facilitating data traffic in the network.

In the configuration according to the present invention, a number of cache devices connected to each other through the network, such as the cache devices 1 (211) to 4 (214) shown in FIG. 2, are grouped as a cache group. Content is collaboratively controlled among the cache devices 1 (211) to 4 (214); that is, content is dispersedly stored among the cache devices 1 (211) to 4 (214). Components of cache control and a method for controlling caches in the present invention will now be described.

Figure 3:
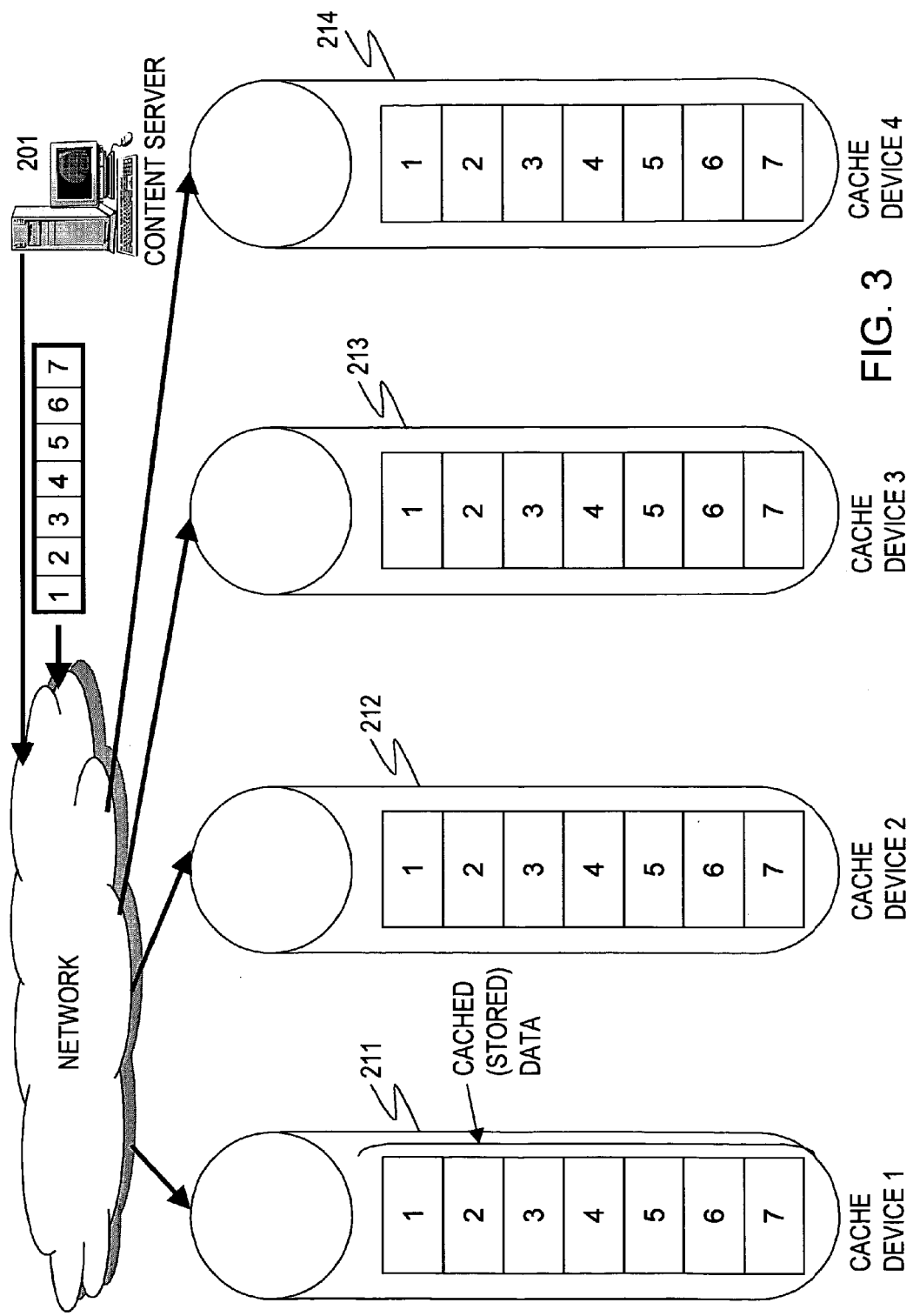
FIG. 3 illustrates data control in a cache device according to the present invention.

As shown in FIG. 3, it is assumed, for example, that the same content data is stored in each of the four cache devices 1 (211) to 4 (214) belonging to the cache group in FIG. 2. Content is composed of data blocks 1 to 7. As shown in FIG. 3, each of the cache devices 1 (211) to 4 (214) stores the same data blocks 1 to 7. Each of the cache devices 1 (211) to 4 (214) receives these data blocks 1 to 7 from the content server 201 and temporarily stores them in response to requests from terminals connected to each of the cache devices; i.e., these data blocks are cached data.

When cache replacement is independently carried out in each cache device as in the known art, each cache device deletes a data block subjected to acquisition requests from the terminals at low frequency in order to store or cache new data in storage areas. When this deleted data is newly distributed, the data is retrieved from the content server 201 because the data does not reside in the cache device.

According to the cache device of the present invention, data is collaboratively controlled in the cache group including the cache devices 1 (211) to 4 (214).

In the method for controlling cached data according to the present invention, data to be cached is controlled with a cache group using a number of cache devices having the same content data. Cache replacement in the cache devices according to the present invention is carried out for each cache group including the cache devices 1 (211) to 4 (214).

Data deletion is controlled so that data that is not deleted and remains in the cache devices of the cache group is different from each other, thereby enabling an efficient use of data storage areas in the cache devices. Moreover, stored data can be transmitted to and output to the terminals from the number of cache devices of the cache group in response to data requests from the terminals. Thus, the total hit rate in the cache devices can be improved.

Referring to FIG. 3, an embodiment will now be described. When the same content data blocks 1 to 7 are stored in each of the cache devices 1 (211) to 4 (214) of the cache group as shown in FIG. 3, data deletion, that is cache replacement, is carried out so that data that is not deleted and remains in the cache devices are different from each other by controlling data by the cache group.

Figure 4:
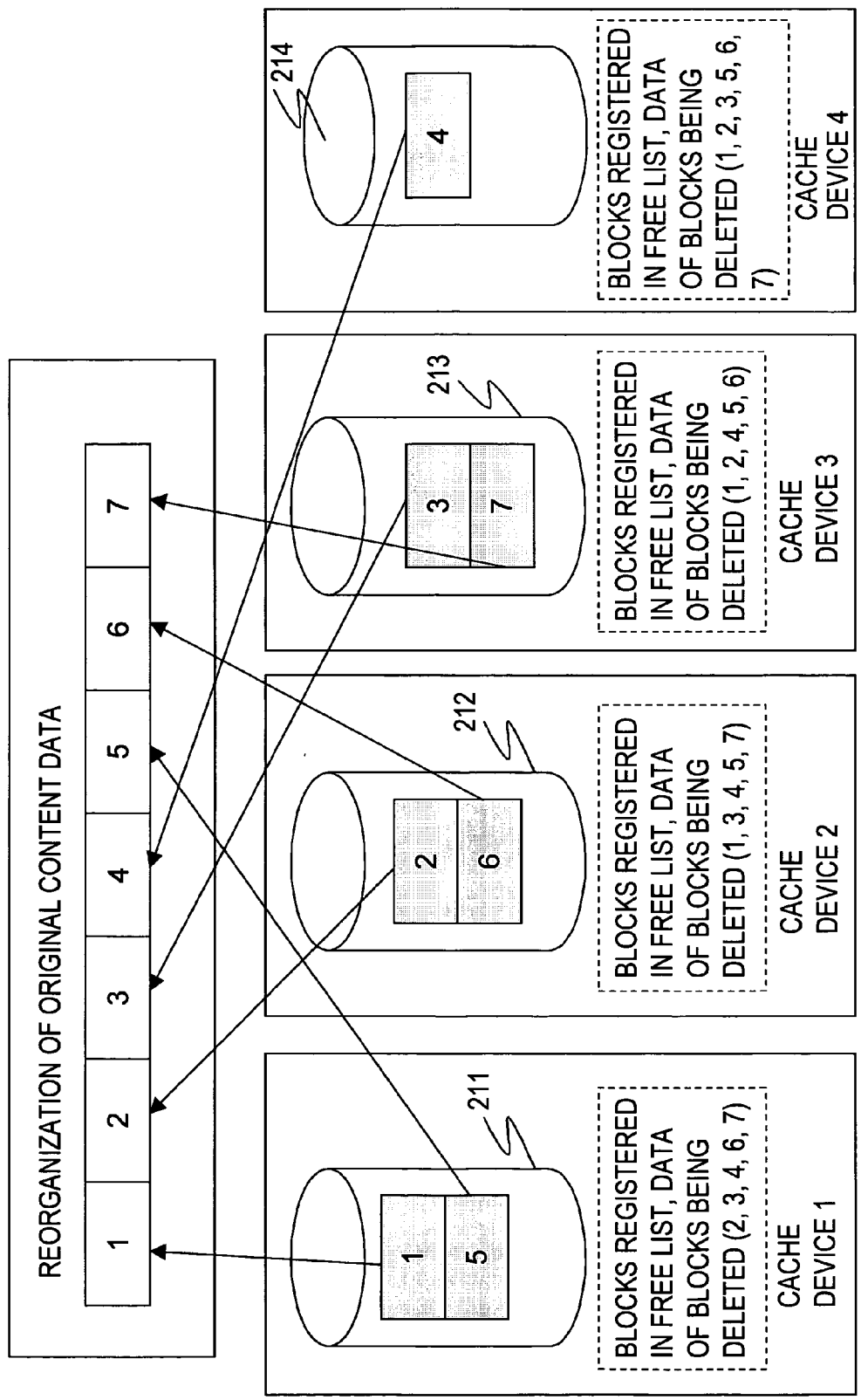
FIG. 4 illustrates data control in a cache device according to the present invention.

As shown in FIG. 4, the result of cache replacement by the cache group is as follows: the cache device 1 (211) stores the data blocks 1 and 5 as cached data, and registers the data blocks 2, 3, 4, 6, and 7 in a free list (corresponding to deleted data blocks); the cache device 2 (212) stores the data blocks 2 and 6 as cached data, and registers the data blocks 1, 3, 4, 5, and 7 in the free list; the cache device 3 (213) stores the data blocks 3 and 7 as cached data, and registers the data blocks 1, 2, 4, 5, and 6 in the free list; and the cache device 4 (214) stores the data block 4 as cached data, and registers the data blocks 1, 2, 3, 5, 6, and 7 in the free list.

In this way, cache replacement is carried out for collaborative content control by the total cache group including the cache devices 1 (211) to 4 (214). An embodiment of cache replacement by a cache group will now be described.

Each cache device scans blocks in the LRU list (refer to FIG. 1) owned by each cache device in the order of possibility that a block is shortly to be deleted by cache replacement at predetermined intervals, queries whether a cache device having content corresponding to the blocks to be deleted is in the neighborhood, and confirms whether the queried cache device can form a cache group with the querying cache device when the queried cache device has the content to be deleted.

A send/receive message applied to this type of query can be covered by, for example, the ICP, which is defined as a protocol for sending and receiving messages among caches connected to each other through networks. A function for confirming whether a cache device can participate in a cache group is not defined in the known specifications of the ICP, but a message for confirming whether a cache device can participate in a cache group can be sent and received by, for example, extending the option flags in the IP_OP_QUERY message defined as an opcode in the ICP.

FIG. 5 (a) illustrates the format of the ICP, which is defined as a protocol for sending and receiving messages among caches connected to each other through networks. FIG. 5 (b) illustrates the format of the IP_OP_QUERY message defined as an opcode in the ICP. As shown in FIG. 5 (a), the ICP format has the following data fields: Opcode, Version, Message Length, Request Number, Options, Option Data, Sender Host Address, and Payload.

To query whether neighboring cache devices have a certain content and can participate in a cache group, a query message specifying a URL serving as resource information of the content file is sent to the neighboring cache devices. An embodiment of this query message is ICP_OP_QUERY specifying a URL serving as resource information of a content file, and having an additional flag for confirming whether neighboring cache devices can participate in a cache group as members concerning this content (for example, 0X20000000 (ICP_FLAG_GROUP_REQ)) by extending the option flags in the ICP. This query message can be implemented by formats and protocols other than this technique.

A querying cache device can send this query on whether a cache device holds a content file to a number of neighboring cache devices at one time by multicasting.

In the present invention, neighboring cache devices are candidate cache devices that possibly form a cache group with a certain cache device and, for example, are set up as cache devices that can send and receive data within predetermined allowed time.

In an embodiment of the neighboring cache device configuration, a number of cache devices that possibly form a cache group are registered in a configuration file of a cache device in advance. Then, round trip times (RTT) between the cache devices are measured by sending a Packet Internet Groper (PING) to these registered cache devices, and a number of cache devices within an allowed RTT are set up as neighboring cache devices.

A cache device setting up a cache group holds a list of neighboring cache devices. The list holds host addresses, IP addresses, and ICP port numbers as data related to target cache devices.

FIG. 6 illustrates a typical cache device list. As shown in FIG. 6, the cache device list holds host addresses, IP addresses, and ICP port numbers as data related to cache devices set up as neighboring cache devices.

For example, a cache device queries whether neighboring cache devices hold a certain content and can participate in a group by broadcasting or multicasting a query message using ICP_OP_QUERY specifying a URL corresponding to the certain content data. The querying cache device waits for responses to the query message.

The querying cache device does not wait indefinitely, and it is not known exactly how many responses are returned when the query is multicasted. Accordingly, for a predetermined time, the querying cache device checks which queried cache device sends a hit response, that is a response indicating the queried cache device holds content data corresponding to the queried URL, and counts the number of hit responses. The result is stored in an internal cache group table (identifiers of target content data (for example, URL or content identifier (ID)), the number of group members, group IDs, and member numbers of members composing a cache group and corresponding IP addresses in a list.

The following ICP messages can be used as response messages, for example: ICP_OP_HIT for a response indicating the queried cache device has content data corresponding to the queried URL, or ICP_OP_MISS for a response indicating the queried cache device does not have the content data.

Each cache device that receives the above queried message sends back the hit response when the cache device agrees to be a member of a cache group with the querying cache device and has a capacity to store data blocks corresponding to the queried content until the cache group is formed.

A cache group concerning content specified by the query message is formed by the cache device sending the query message and at least one cache device sending back the hit response.

When the cache device sending the query message and receiving the response message sets up a cache group upon receiving at least one hit response, the cache device notifies each cache device composing the cache group of group configuration information such as the number (N) of cache devices composing the cache group, a group member number (m) serving as an identifier of the cache device (member) composing the cache group, and a content data identifier (CID) of content data processed in the cache group.

The group member number (m) serving as the cache device (member) identifier is set corresponding to the IP address of the cache device. Each cache device (member) composing the cache group acquires the group member numbers (m) serving as the cache device (member) identifiers of all the other cache devices (members) composing the cache group and the IP addresses corresponding to the respective group member numbers (m).

The ICP can be used for notifying the group configuration information, as in the query message described above. For example, a unique opcode ICP_OP_NOTIFY for information notification is added to the ICP to store the group member numbers of the cache devices (members) and the IP addresses in the Payload field of ICP_OP_NOTIFY as shown in FIG. 7 and to be sent to each cache device composing the cache group for giving this information. FIG. 7 illustrates an example of IP_OP_NOTIFY including IP addresses according to the Internet Protocol Version 4 (IPv4).

As shown in FIG. 7, group member numbers (cache members #1 to #N) and IP addresses of all (N) cache devices (members) composing a cache group are stored in the Payload field. Each cache device (member) composing the cache group is notified of the group member numbers and the corresponding IP addresses of all the other cache devices (members) composing the cache group by receiving this information.

As shown in FIG. 8, each of the cache devices sending the group configuration information and the cache devices receiving the group configuration information, these cache devices belonging to the cache group, stores a cache group table having the group configuration information in a memory as its own control information.

The cache group table stores information obtained based on the group configuration information described above (that is, identifiers of content each of which is collaboratively controlled in each set-up cache group), the number of cache devices composing each cache group [N], cache group identifiers (ID), and member numbers and corresponding IP addresses in a list of cache group members.

Content data is not controlled independently by each cache device of the cache group set up in this way, but is controlled by the total group. A method for controlling content in each cache device in a cache group will now be described.

Figure 9:
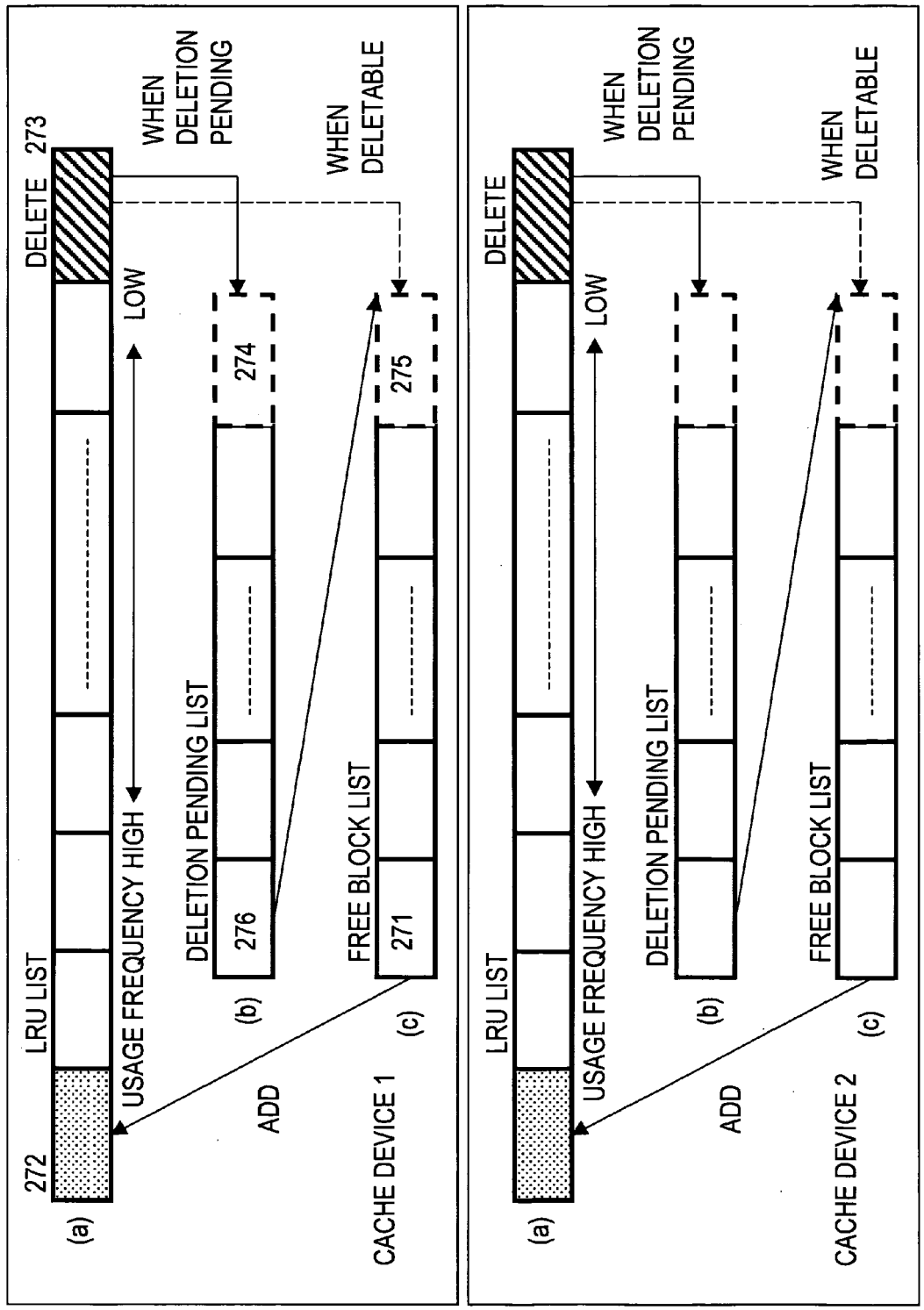
FIG. 9 illustrates lists used for controlling data in a cache device according to the present invention.

As shown in FIG. 9, each cache device in a cache group includes an LRU list (a) that lists data blocks in the order of usage frequency, a deletion pending list (b), and a free block list (c) that has pointer information of free area blocks in the cache.

The deletion pending list is used for controlling data blocks that are temporarily set to a deletion pending status out of data blocks removed from the LRU list, for example, data blocks to be subjected to deletion. Whether data blocks corresponding to entries removed from the LRU list are controlled in the free block list as data blocks subjected to deletion or in the deletion pending list as data blocks in deletion pending status is judged by the following process:

The process for judging whether each data block is set to a deletion pending status is as follows:

(1) C mod N is calculated;
(2) V=N when C mod N=0, and
V=(C mod N) when C mod N≠0; and
(3) the data block is set to a deletion pending status when V=m, and
the data block is not set to a deletion pending status and is deleted when V≠m, where C is the block offset number from the head of content subjected to judgment, N is the number of cache devices of a cache group, and m is the group member number assigned to a cache device in question in the cache group.

Data blocks are stored among the cache devices without duplication by repeating the above process in each cache device of the cache group, as described above with reference to FIG. 4.

That is, in this arrangement: the cache device 1 (211) having m=1 stores the data blocks 1 and 5 in deletion pending status and controls these blocks in the deletion pending list, and controls the data blocks 2, 3, 4, 6, and 7 in the free list as blocks to be subjected to deletion; the cache device 2 (212) having m=2 stores the data blocks 2 and 6 in deletion pending status and controls these blocks in the deletion pending list, and controls the data blocks 1, 3, 4, 5, and 7 in the free list; the cache device 3 (213) having m=3 stores the data blocks 3 and 7 in deletion pending status and controls these blocks in the deletion pending list, and controls the data blocks 1, 2, 4, 5, and 6 in the free list; and the cache device 4 (214) having m=4 stores the data block 4 in deletion pending status and controls this block in the deletion pending list, and controls the data blocks 1, 2, 3, 5, 6, and 7 in the free list.

The details of the above process will now be described with reference to internal structures of the LRU list, the deletion pending list, and the free block list owned by each cache device in the cache group.

Figure 10:
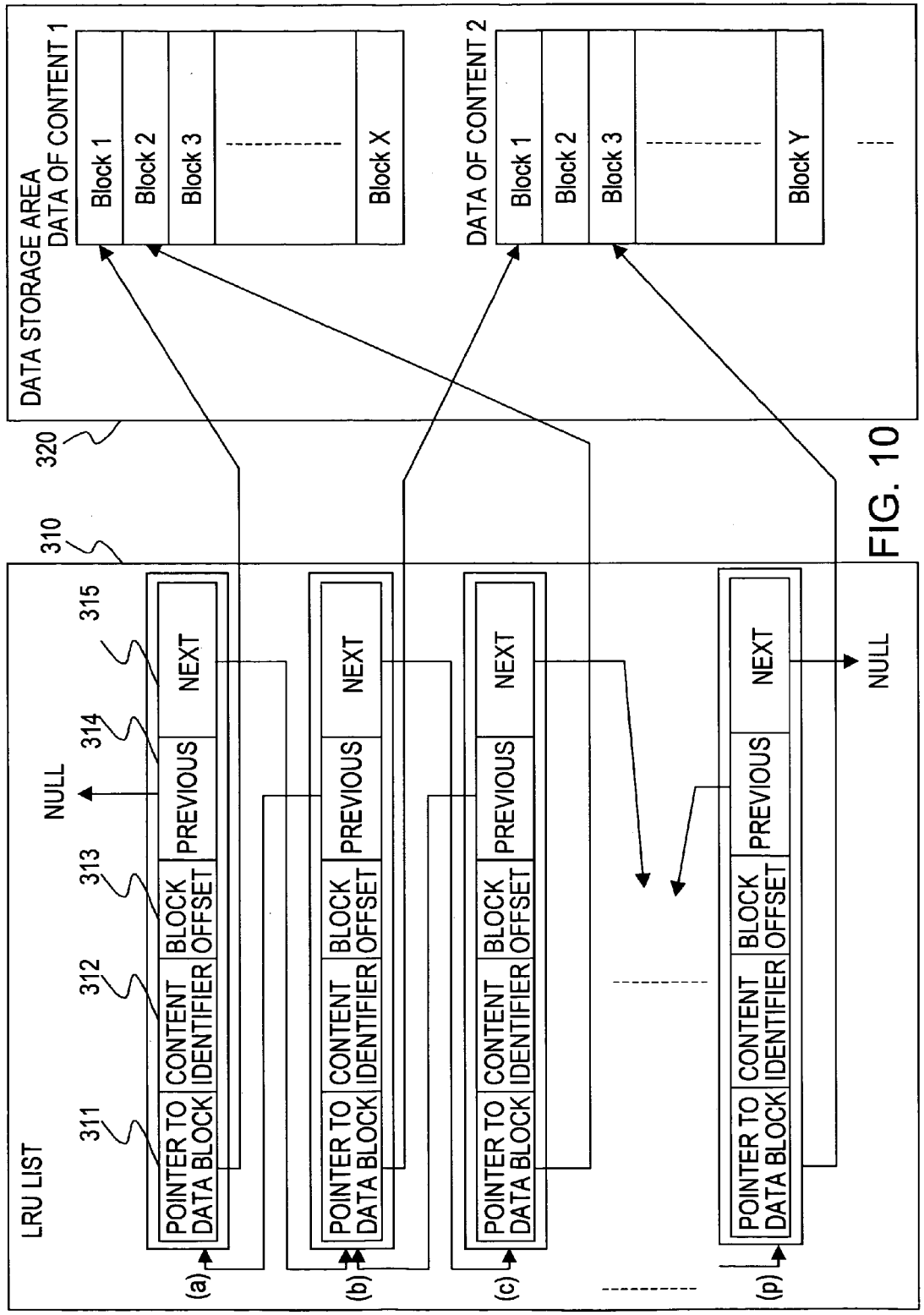
FIG. 10 illustrates an LRU list used for controlling data in a cache device according to the present invention.

Referring to FIG. 10, the structure of the LRU list will now be described. As shown in FIG. 10, each cache device includes a data storage area 320 serving as a storage area that stores its own cached data and an LRU list 310 for data stored in the data storage area.

The LRU list 310 is generated corresponding to each data block. In this case, list data records (entries) (a) to (p) are retained corresponding to respective data blocks. FIG. 10 illustrates the internal structure of the LRU list, each entry of the LRU list including a pointer 311 pointing to a data block, a content identifier 312, a block offset 313, a pointer 314 pointing to a previous list data record (entry) in the same LRU list, and a pointer 315 pointing to a succeeding list data record (entry) in the same LRU list.

The pointer 311 pointing to a data block indicates a storage address of a real content data block in the data storage area 320, the content data block corresponding to each list data record. The content identifier 312 includes, for example, a URL or identifier data of each data block. The block offset 313 indicates an offset of each content data block from the head of the content.

For example, a differential address in a data storage area can be used as an offset, but a block that divides data into parts of predetermined size is here used as a unit for control and the offset has a block offset number C from the head of content. A block offset set in the list data record (a) is 1, a block offset set in the list data record (b) is 2, and a block offset set in the list data record (p) is N for the content data having N blocks. In this way, a block offset is set to the block offset number C being data for identifying a displacement from the head of each content.

The pointer 314 pointing to a previous list data record (entry) and the pointer 315 pointing to a succeeding list data record (entry) in the same LRU list are pointer data for a previous entry and a succeeding entry, respectively, in the same list. Thus, the pointer, pointing to the previous list data record, in the list data record (a) at the head of the list is set to NULL, and the pointer, pointing to the succeeding list data record, in the list data record (p) at the end of the list is also set to NULL.

The identifier and the block offset number C from the head of the content corresponding to the pointer, pointing to the data block, in each entry of the LRU list easily can be obtained by reading data in each entry.

Figure 11:
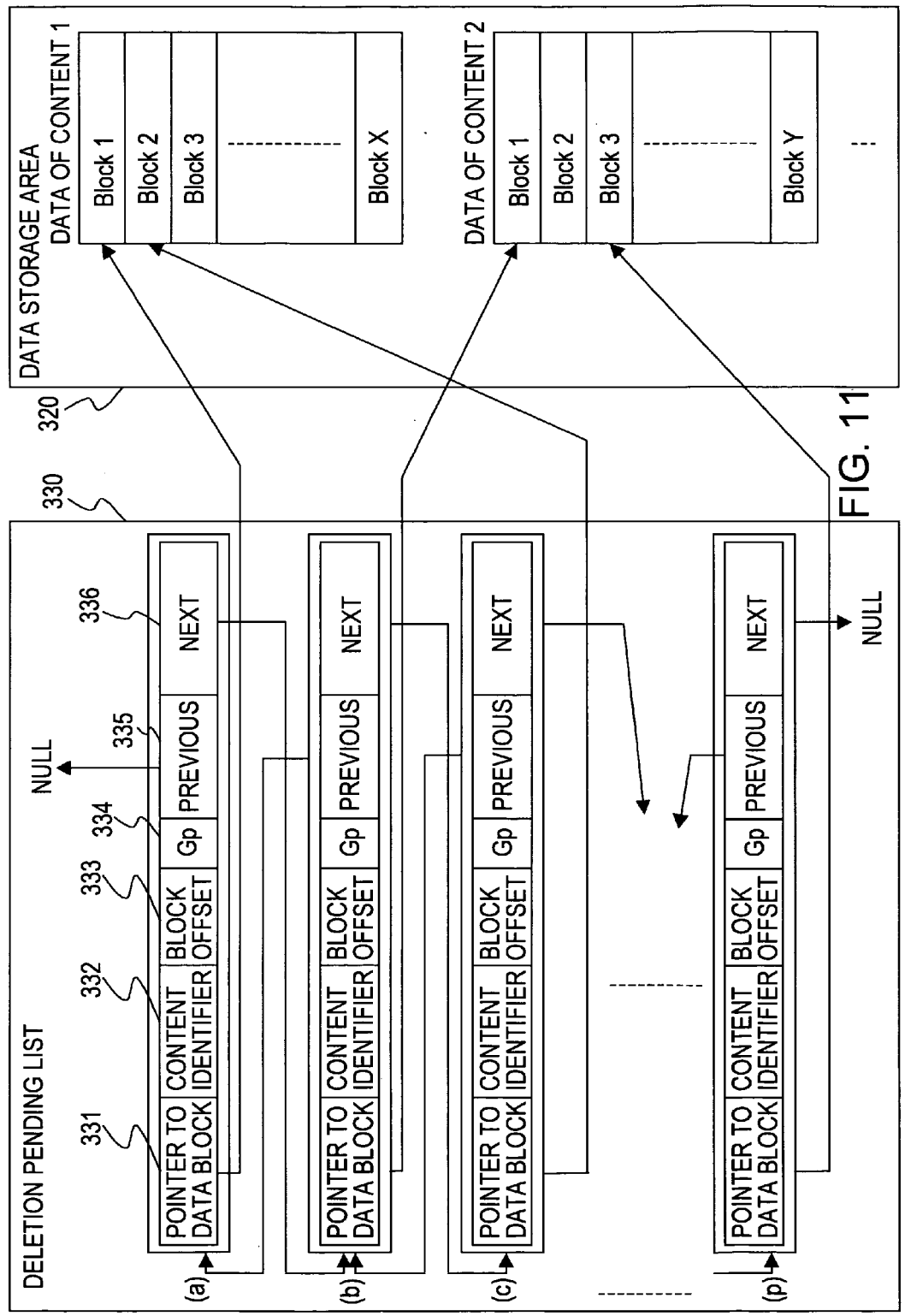
FIG. 11 illustrates a deletion pending list used for controlling data in a cache device according to the present invention.

Referring to FIG. 11, the structure of the deletion pending list will now be described. As described above, the deletion pending list is used for controlling data blocks temporarily set to a deletion pending status out of those data blocks to be subjected to deletion in the LRU list.

As shown in FIG. 11, a deletion pending list 330 owned by a cache device is generated corresponding to data blocks set to a deletion pending status. List data records (entries) (a) to (p) are retained corresponding to respective data blocks set to the deletion pending status. FIG. 11 illustrates the internal structure of the deletion pending list, each entry of the deletion pending list including a pointer 331 pointing to a data block, a content identifier 332, a block offset 333, a group identifier (GP) 334 of a set-up cache group, a pointer 335 pointing to a previous list data record (entry) in the same deletion pending list, and a pointer 336 pointing to a succeeding list data record (entry) in the same deletion pending list.

The structure of stored data in the deletion pending list 330 owned by a cache device is the same as that of stored data in the LRU list plus the group identifier (GP) 334. The group identifier (GP) 334 is a group ID that is set when a cache group is set up for identifying the cache group. A cache device setting up the cache group sets the group identifier (GP) 334 and notifies other cache devices composing the cache group of the group identifier (GP) 334 with group configuration information. The group identifier (GP) 334 is registered in the cache group table (refer to FIG. 8).

Figure 12:
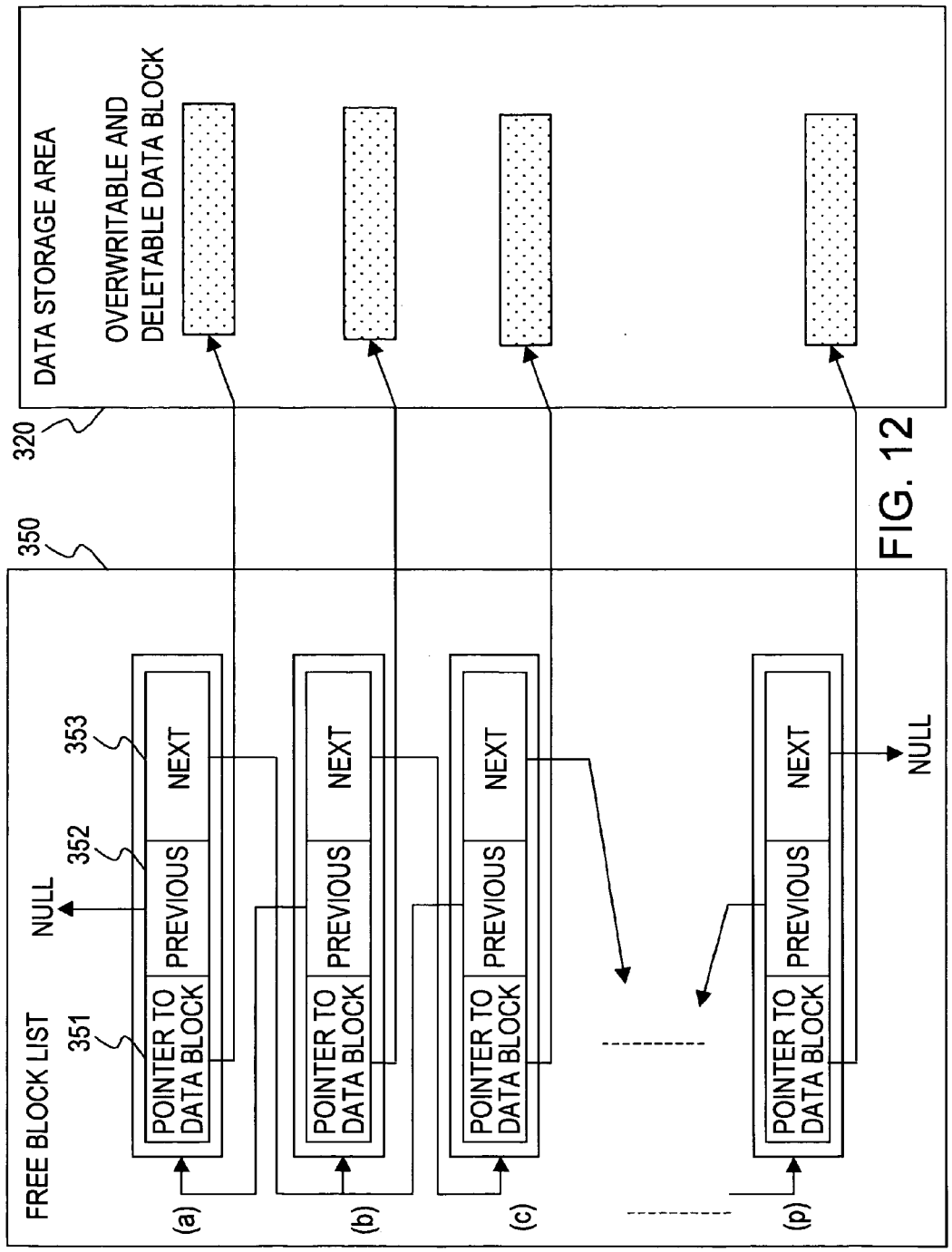
FIG. 12 illustrates a free block list used for controlling data in a cache device according to the present invention.

Referring to FIG. 12, the structure of the free block list will now be described. As described above, the free block list is used for controlling data blocks that are not set to a deletion pending status but are directly subjected to deletion, and data blocks that are temporarily set to a deletion pending status and are subsequently subjected to deletion, out of data blocks subjected to deletion in the LRU list.

As shown in FIG. 12, each entry of a free block list 350 owned by a cache device includes a pointer 351 pointing to a data block that can be overwritten and deleted out of data storage blocks in the data storage area 320, a pointer 352 pointing to a previous list data record (entry) in the same free block list, and a pointer 353 pointing to a succeeding list data record (entry) in the same free block list.

The following process now will be described. Each cache device of a cache group receives new input data, so that data blocks are controlled in the deletion pending list or the free block list.

First, a cache device selects entries (list data records) to be processed from the LRU list and reads out a block offset number C (the block offset 313 in FIG. 10) from each of the entries selected from the LRU list.

The cache device then carries out the process as described above based on the value of the block offset number C:

(1) C mod N is calculated.

(2) V=N when C mod N=0, and
V=(C mod N) when C mod N≠0.

(3) A data block is set to a deletion pending status when V=m. That is, a list data record for controlling the corresponding data block is put in the deletion pending list. This data block is not deleted but is stored in the data storage area.

(3') The data block is not set to a deletion pending status when V≠m. That is, a list data record for controlling the corresponding data block is put in the free block list. This data block can be deleted and overwritten in the data storage area.

When V=m, the cache device judges that the cache device itself in a set-up cache group needs to store the data block. Accordingly, the cache device removes a corresponding entry to be deleted from the LRU list and puts a corresponding entry in the deletion pending list, so that the cache device does not delete but stores the content data block in the memory, and controls the content data block in the deletion pending list. When V≠m, the cache device itself in the set-up cache group does not need to store the data block. That is, the cache device judges that another group member stores the data block. Accordingly, the cache device removes the corresponding entry to be deleted from the LRU list and puts a corresponding entry in the free block list, so that the cache device sets the corresponding data block to a deletable status. Another cache group member stores the data block subjected to deletion and can transmit the stored data block to terminals. This process will be described later.

Entries are put in these lists as shown in FIG. 9. For example, in the cache device 1, upon receiving a request for writing a new data block, the new data block is written to a data storage region, in the data storage area, corresponding to a data block pointer set in a leading entry 271 of the free block list (c), and information of the written data block is set in a leading entry 272 of the LRU list shown in FIG. 10.

When the length of the LRU list consequently exceeds an allowable length, an ending entry 273 of the LRU list is removed and a corresponding entry is put in the deletion pending list or the free block list. Whether the corresponding entry is put in the deletion pending list or the free block list is determined by calculating C mod N and judging the value V as described above in (1) to (3).

As a result of the above determination, the ending entry 273 of the LRU list is removed and a corresponding ending entry 274 is put in the deletion pending list when it is determined that the ending entry 273 of the LRU list is to be removed and the corresponding ending entry is put in the deletion pending list, and the ending entry 273 of the LRU list is removed and a corresponding ending entry 275 is put in the free block list when it is determined that the ending entry 273 of the LRU list is removed and the corresponding ending entry is put in the free block list.

When the length of the deletion pending list exceeds a predetermined length upon adding a new entry to the deletion pending list, an entry corresponding to a leading entry 276 of the deletion pending list is put in the free block list as the ending entry 275.

When the buffer capacity predetermined according to the free block list falls short upon storing new data, the buffer capacity is secured by removing an entry in the LRU list or the deletion pending list and putting a corresponding entry in the free block list; that is, by deleting a data block.

A memory region pointed to by a data block pointer specified in the entry that is put in the free block list can be used for writing new input data, and current content of the data block is discarded.

Referring to the flow charts and the sequence diagrams, the process for generating the cache group described above and controlling data in the cache group will now be described.

Figure 13:
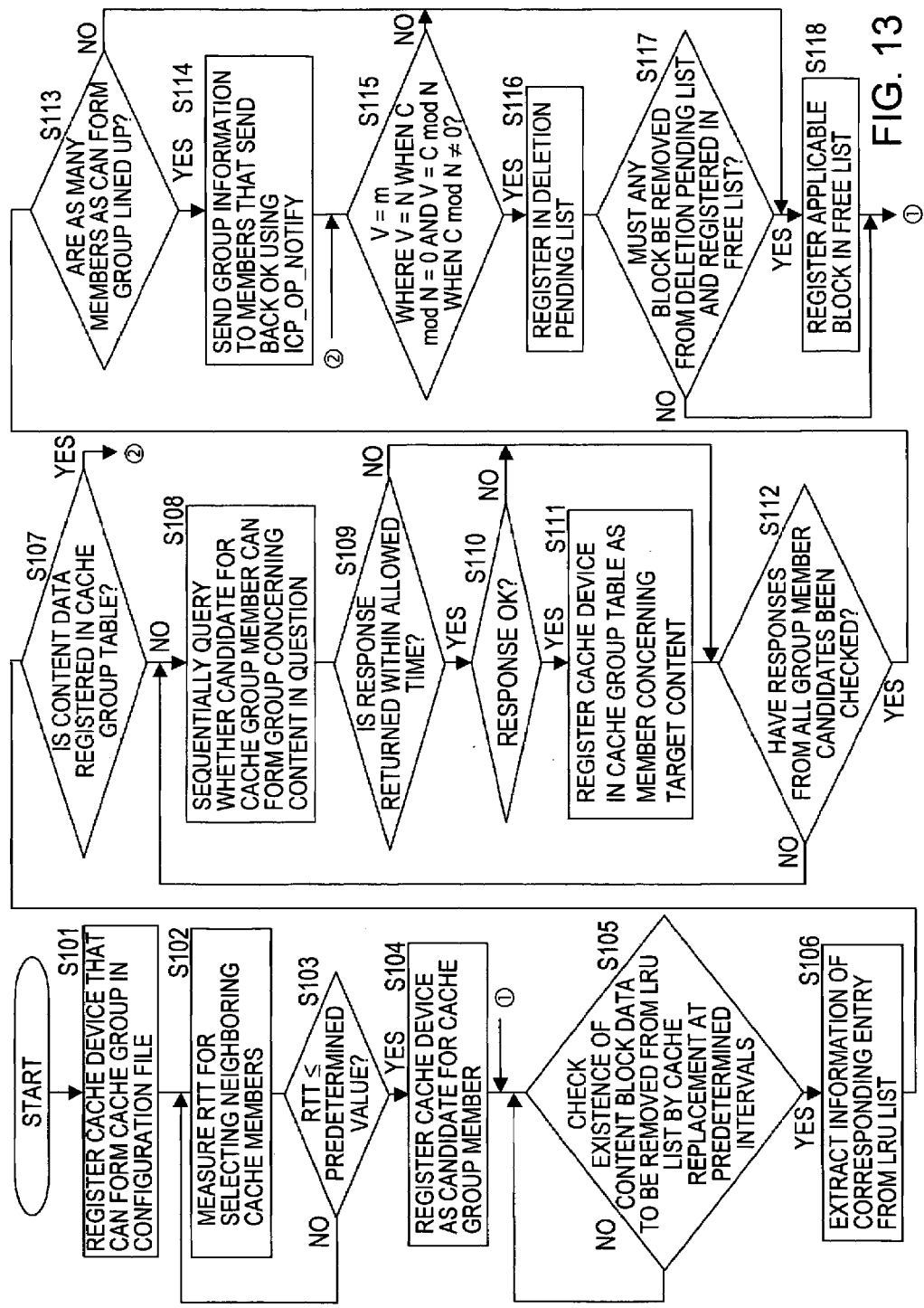
FIG. 13 is a flow chart illustrating group formation and data control in a cache device according to the present invention.
Figure 14:
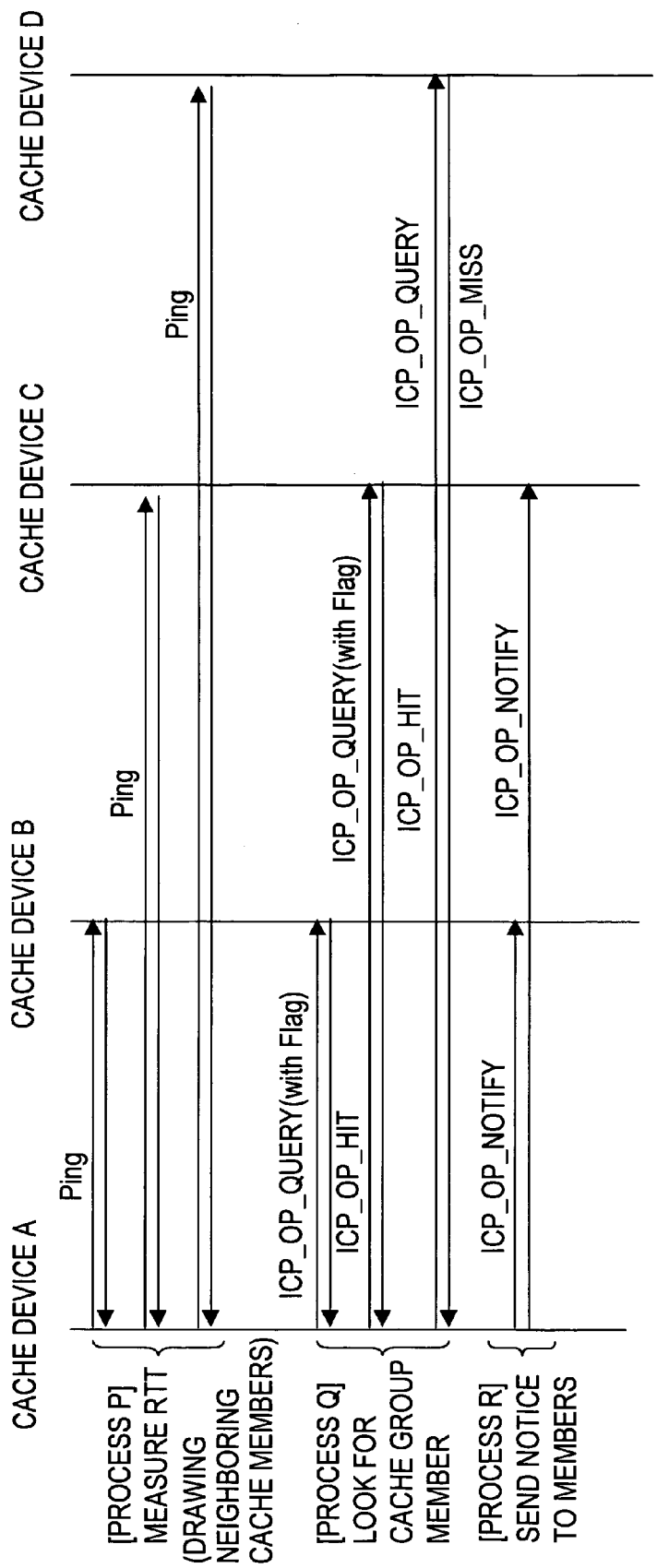
FIG. 14 is a sequence diagram illustrating send/receive messages used in group formation and data control in a cache device according to the present invention.

Referring to FIGS. 13 and 14, the process for generating a cache group and controlling data will be described first.

A cache group is generated for collaborative control of content data blocks stored in each cache device. Entries respectively corresponding to these data blocks are removed from the LRU list to the deletion pending list. Referring to the flow chart in FIG. 13, the process for generating a cache group will now be described.

First, a certain cache device connected to a network registers candidates for members of a cache group in a preparation process; that is, steps S101 to S104 in FIG. 13.

In step S101, information of cache devices that possibly compose a cache group is registered. This information includes registration information such as a host name, an IP address, and an ICP port number of at least one cache device selected by, for example, an operator.

Then, cache devices that can really compose a cache group are determined on the basis of these pieces of registration information. That is, RTTs between the cache devices are measured by sending a PING to each of the cache devices registered in step S101, and a number of cache devices within an allowed RTT are selected. In step S104, those cache devices that satisfy a predetermined threshold RTT are set up as neighboring cache devices on the basis of measurement of RTTs in step S102 and judgment in step S103.

Each cache device has a list of cache devices that are set up as neighboring cache devices. The list holds host names, IP addresses, and ICP port numbers of the neighboring cache devices, as described above referring to FIG. 6.

[Process P] of FIG. 14 is the data communication sequence corresponding to steps S102 to S104 of FIG. 13. In the sequence diagram of FIG. 14, a cache device A mainly carries out the process, and cache devices B, C, and D correspond to the cache devices registered in step S101 shown in FIG. 13.

[Process P] of FIG. 14 corresponds to the measurement of RTTs. The cache device A measures RTTs between the cache devices by sending a PING to each of the registered cache devices B, C, and D, and selects a number of cache devices within an allowed RTT.

Returning to the flow chart in FIG. 13, the associated description now follows. When the list of neighboring cache devices illustrated in FIG. 6 is generated, each cache device carries out cache replacement at predetermined intervals to judge whether there is any content data block that needs to be removed from its own LRU list in step S105.

When a cache device judges that there is a data block that needs to be removed from the LRU list, the cache device proceeds to step S106 and extracts an entry to be removed from the LRU list. In step S107, the cache device then judges whether content corresponding to the entry is registered in a cache group table.

A cache group table stores identifiers of content that is collaboratively controlled in each set-up cache group, the number of cache devices composing each cache group [N], cache group identifiers (ID), and member numbers and corresponding IP addresses in a list of cache group members, as described above referring to FIG. 8. Registration of content in the cache group table results in the content being collaboratively controlled in a set-up cache group.

When the content to be removed from the LRU list is found to be registered in the cache group table in step S107, the content is collaboratively controlled in the set-up cache group. In this case, step S115 and subsequent steps are carried out as collaborative control. The details of this process will be described later.

When the content to be removed from the LRU list is found not to be registered in the cache group table in step S1107, a new cache group corresponding to the content to be removed from the LRU list is generated in step S108 and subsequent steps.

In step S108, a query message on whether each of the cache devices, which are set in the list of neighboring cache devices (refer to FIG. 6) within a threshold RTT in step S104 described above, can form a cache group concerning the content to removed from the LRU list is sent to each of the cache devices.

This query message is for querying whether a cache device has content corresponding to an entry to be removed from the LRU list and can participate in a cache group. In the sequence diagram of FIG. 14, ICP_OP_QUERY in [process Q] corresponds to this query message.

The cache device waits for a response to the query message in step S109 of FIG. 13, judges whether a response indicates that it is possible to form a group (HIT) in step S110, registers data of a cache device that send a response indicating that the cache device can form a group (HIT) in the cache group table (refer to FIG. 8) in step S11, and finishes temporary cache group set-up after judging that responses from all the group member candidates (the cache devices registered in the neighboring cache device list shown in FIG. 6) are checked in step S112.

In the sequence diagram of FIG. 14, in response to ICP_OP_QUERY (query message) in [process Q], the cache devices B and C that can form a group (HIT) send ICP_OP_HIT of the ICP message as a response message to the cache device A, and the cache device D that cannot form a group (MISS) sends ICP_OP_MISS of the ICP message as a response message to the cache device A. In this case, the cache device A forms a cache group with the cache devices B and C.

In step S113 of the processing flow in FIG. 13, it is judged whether HIT responses from as many cache devices as can form a cache group are received. For example, when HIT responses are received from one or more cache devices, it is judged that a cache group can be set up. When HIT responses from as many cache devices as can form a cache group are not received, the process proceeds to S118 where a cache group is not set up but an entry corresponding to the entry removed from the LRU list is put in the free block list instead. In this case, the content corresponding to this entry is not controlled collaboratively in a cache group.

When it is judged that HIT responses from as many cache devices as can form a cache group are received in step S103, group configuration information is sent to those cache devices that sent back a HIT response and are registered as cache group members in the cache group table (refer to FIG. 8) in step S114.

The group configuration information includes the number (N) of cache devices composing the cache group, a group member number (m) serving as an identifier of the cache device (member) composing the cache group, and a content data identifier of content data processed in the cache group. The group member number (m) is set corresponding to the IP address of the cache device. Each cache device (member) composing the cache group acquires the group member numbers (m) serving as the cache device (member) identifiers of all the other cache devices (members) composing the cache group and the IP addresses corresponding to the respective group member numbers (m).

In the sequence diagram of FIG. 14, ICP_OP_NOTIFY in [process R] corresponds to the process of sending the group configuration information. The format of the transmission data conforms to that described above referring to FIG. 7. As shown in FIG. 8, each of the cache device sending the group configuration information and the cache devices receiving the group configuration information, these cache devices belonging to the cache group, stores the cache group table having the group configuration information in a memory as its own control information.

Step S115 and subsequent steps are the process for removing content from the LRU list, the process being carried out as collaborative content control in the set-up cache group.

In step S115, each cache device carries out the following process concerning an entry to be removed from the LRU list, based on each value of the block offset number C, the number N of the cache devices of the cache group, and the group member number m assigned to the cache device in the cache group:

(1) C mod N is calculated.
(2) V=N when C mod N=0, and
V=(C mod N) when C mod N≠0.
(3) Whether V=m is judged.
When V=m, the cache device judges that the cache device itself in the set-up cache group needs to store the content.

Accordingly, in step S116, the cache device removes a corresponding entry to be deleted from the LRU list and puts a corresponding entry in the deletion pending list; that is, the cache device does not delete but stores the content data block in the memory and controls the content data block in the deletion pending list.

When V≠m, the cache device itself in the set-up cache group does not need to store the content. That is, the cache device judges that another group member stores the data block. Accordingly, in step S118, the cache device removes the corresponding entry to be deleted from the LRU list and puts a corresponding entry in the free block list. In this case, the cache device deletes the corresponding data block. Though the data block is deleted, another cache group member stores the data block and can transmit the stored data block to terminals. This process will be described later.

When the length of the deletion pending list exceeds an allowable value (Yes in S117) upon removing an entry from the LRU list and putting a corresponding entry in the deletion pending list in step S116, an entry in the deletion pending list is removed and a corresponding entry is put in the free block list in step S118.

Figure 15:
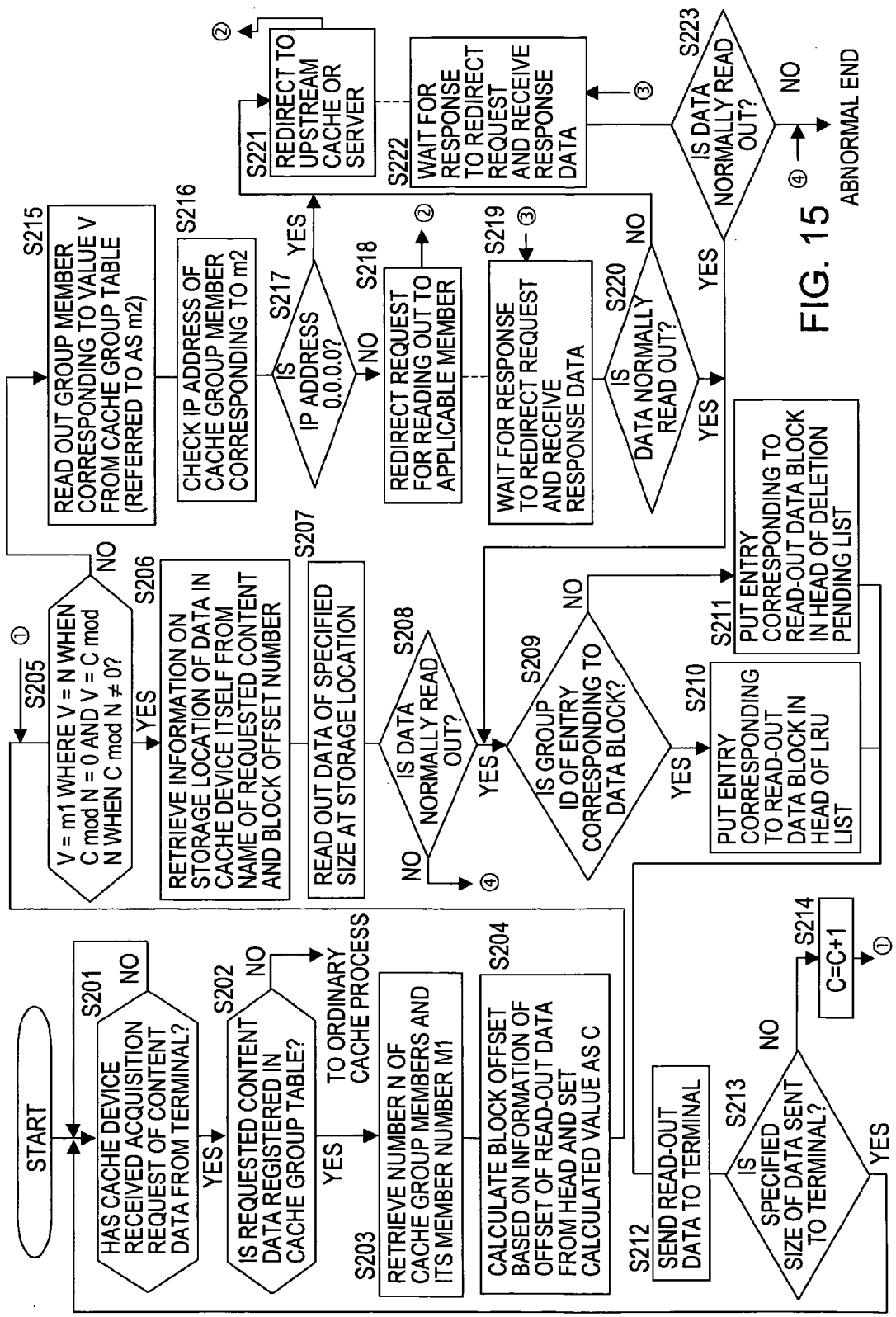
FIG. 15 is a flow chart illustrating a process of retrieving and sending data in a cache device according to the present invention.
Figure 16:
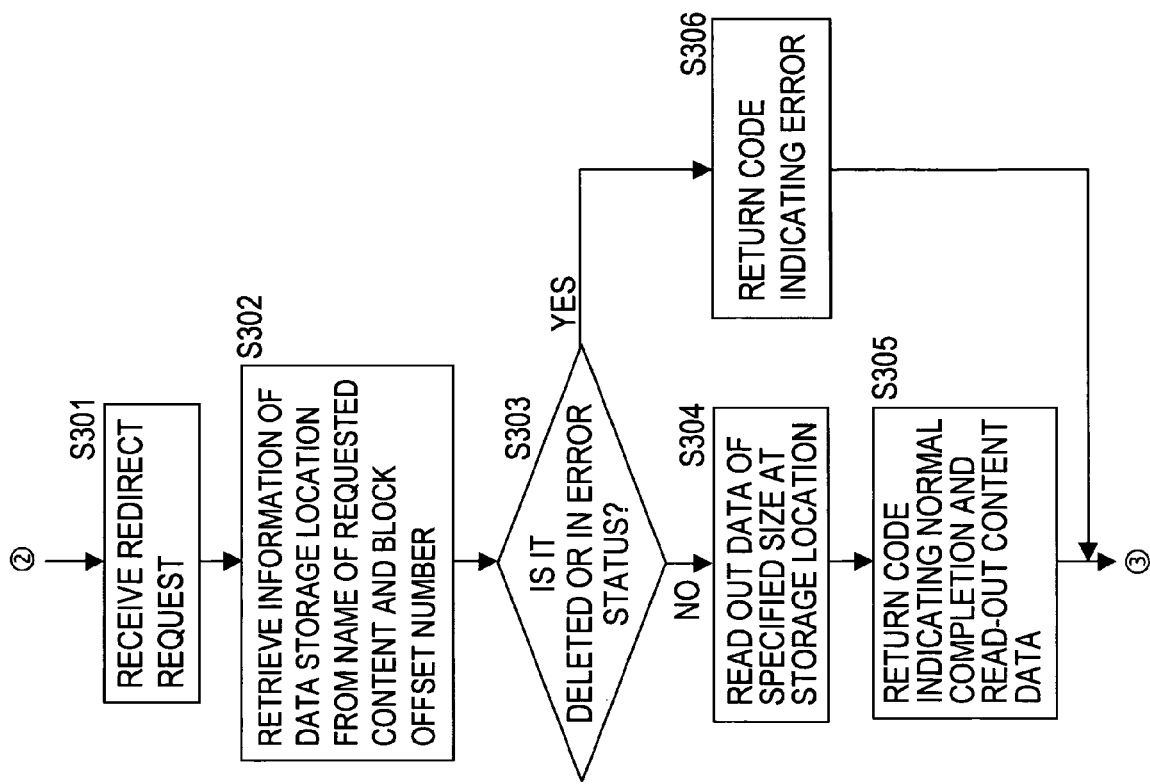
FIG. 16 is a flow chart illustrating a process of retrieving and sending data by redirect processing in a cache device according to the present invention.
Figure 17:
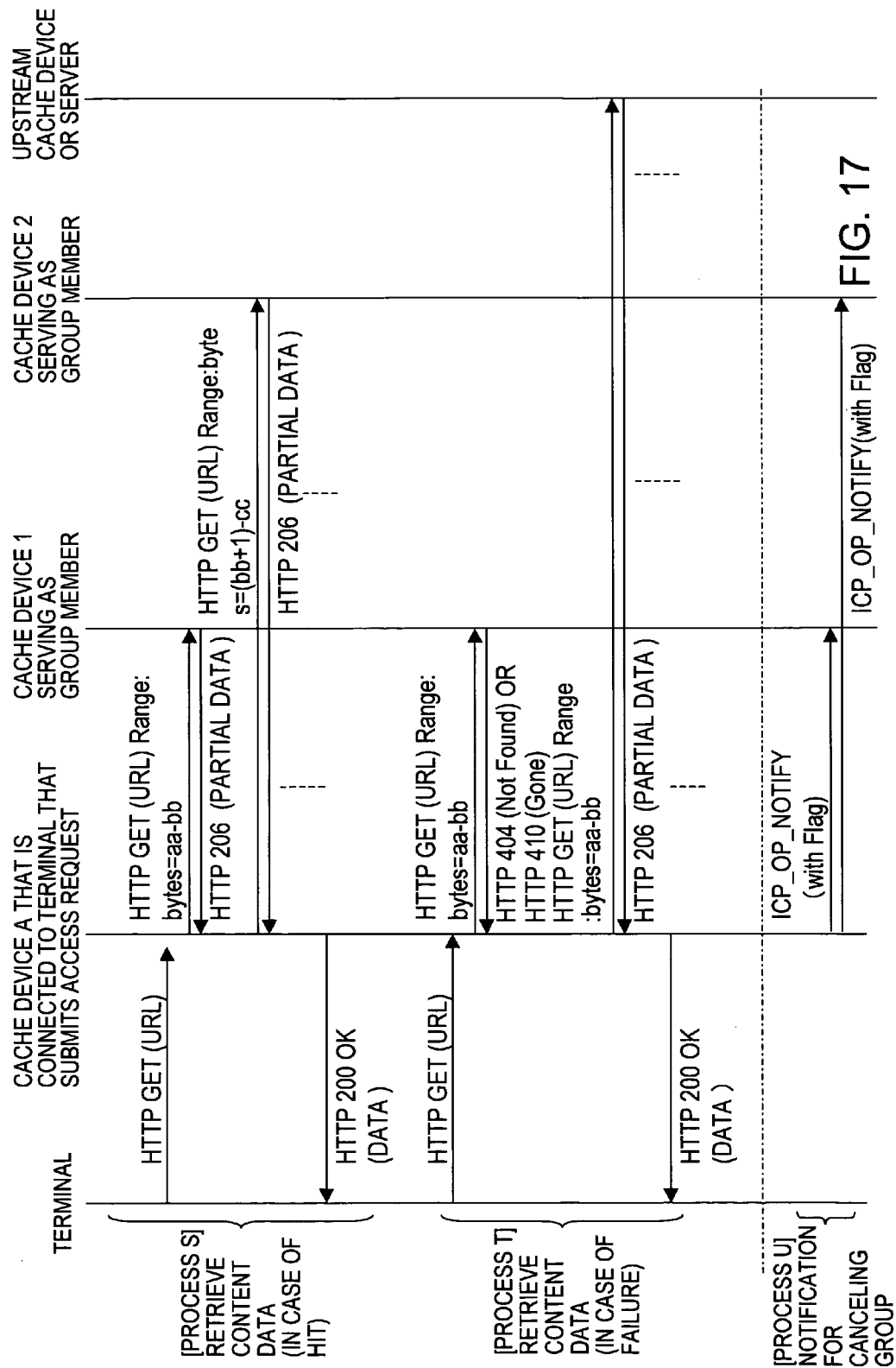
FIG. 17 is a sequence diagram illustrating send/receive messages used in a process of retrieving and sending data in a cache device according to the present invention.

Referring to FIGS. 15 to 17, the process at the time when a content acquisition request is submitted from a terminal to a cache device that controls content by a cache group will now be described.

When a cache device receives a content acquisition request from a terminal in step S201 of FIG. 15, the cache device judges whether the requested content data is registered in a cache group table (refer to FIG. 8) in step S202. When the requested content is not registered, no group controls the content. Thus, the cache device carries out an ordinary process; that is, the cache device retrieves and sends the content to the terminal when the content is stored in the cache device, and the cache device retrieves the content from a content server and sends the retrieved content to the terminal when the content is not stored in the cache device.

When the requested content data is registered in the cache group table (refer to FIG. 8), the content is controlled by a group. Thus, in step S203, the cache device retrieves the number N of group members and a member number m1 for the cache device from the cache group table (refer to FIG. 8).

In step S204, a block offset number C is obtained by calculating a block offset based on offset information of the content in the content acquisition request from the terminal. In step S205, the following process is carried out based on each value of the number N of the cache devices of the cache group and the group member number m1 assigned to the cache device in the cache group:

(1) C mod N is calculated.
(2) V=N when C mod N=0, and
V=(C mod N) when C mod N≠0.
(3) Whether V=m1 is judged.

V=m1 refers to the request content being stored in the cache device. Thus, the cache device proceeds to step S206 where the cache device retrieves information of a data storage area in the cache device itself from the name of the requested content and the block offset number in an entry in an LRU list or a deletion pending list. The cache device reads out the data in step S207, verifies normal completion of readout (S208), and judges whether a group ID (Gp)=0 in step S209.

The cache device sets the group ID (Gp) to 0 by updating the group ID (Gp) in the cache group table when the set-up cache group cannot be maintained due to withdrawal of some member from the set-up cache group. When the group ID (Gp) is 0, the applicable entry indicates that the cache group cannot be formed due to withdrawal of a number of members from the cache group. In step S210, the cache device puts an entry in a head of the LRU list but not the deletion pending list.

When the group ID (Gp) is not 0, the cache device puts a corresponding entry in a head of the deletion pending list in step S211 because the data block is accessed.

The cache device sends the read-out data to the requesting terminal in step S212 and verifies completion of sending a specified size of data (S213). When the transmission is not completed, the content is sent to the terminal by repeating step S205 and the subsequent process after updating the block offset number C (C=C+1) in step S214.

In step S205, C mod N is calculated and whether V=m1 is judged based on each value of the number N of the cache devices of the cache group and the group member number m1 assigned to the cache device in the cache group. When V=m1, the requested content is not stored in the cache device itself. Thus, the cache device proceeds to step S215 where the cache device retrieves a group member corresponding to the calculated value V (referred to as m2) from the cache group table (refer to FIG. 8).

In step S216, the cache device retrieves an IP address of the group member corresponding to the calculated value V (referred to as m2) from the cache group table (refer to FIG. 8). In step S117, the cache device judges whether the retrieved IP address is 0.0.0.0. When the retrieved IP address is 0.0.0.0, the entry is for a member that withdrew from the cache group. In this case, the cache device redirects the request to an upstream cache device or the content server (S221).

When the cache device judges that the retrieved IP address is not 0.0.0.0 in step S217, the entry is for a cache group member. The cache device proceeds to step S218 where the cache device submits a request for reading out the content (redirect request) based on the IP address corresponding to the cache group member (m2).

Referring to FIG. 16, the process in the cache device that received the redirect request will now be described. In the process, a cache device of a cache group responds to a request for reading out content (redirect request) from another group member.

When a cache device receives a request for reading out content (redirect request) in step S301, the cache device proceeds to step S302 where the cache device retrieves information of a data storage area in the cache device itself from the name of the requested content and the block offset number in an entry in the LRU list or the deletion pending list. In step S303, the cache device judges availability of the data and an error status. When the data is deleted or there is an error status, the cache device sends a code indicating an error to the other cache device that sent the request for reading out the content (redirect request) in step S306.

When it is judged that the cache device stores the data and can read out the data upon judging the availability of the data and an error status in step S303, the cache device reads out as much data as specified in step S304 and sends read-out data and a code indicating normal completion to the other cache device that submitted the request for reading out the data in step S305.

Returning to the processing flow in FIG. 15, the following description is now provided. When the cache device receives a response from the redirect request destination in step S219 or S222, the cache device judges whether the data has been read out normally in step S220 or S223. In case of Yes, the cache device proceeds to step S209 where the cache device carries out the subsequent process such as moving the entries in the list and sending the retrieved content to the terminal. When the data has not been read out normally, the cache device terminates the process, resulting in an abnormal end.

Before the cache device terminates the process, resulting in an abnormal end, the cache device may carry out the following process for obtaining the target data. After the cache device receives the error response, the cache device redirects the request to an upstream cache device when the upstream cache device (that is on the path to the server and nearer to the cache device than the server) exists as a redirect destination, and redirects the request directly to the content server when there is no such upstream cache device.

Referring to FIG. 17, the outline of the data communication sequence between cache devices in the process described above will now be described. FIG. 17 includes, from the left end:

a terminal that sends a content acquisition request;

a cache device A that receives the content acquisition request from the terminal;

a cache device 1 that forms a cache group with the cache device A;

a cache device 2 that forms the cache group with the cache device A; and an upstream cache device for the cache device A or a server.

[Process S] is a processing sequence when the cache device A retrieves content data requested from the terminal from the cache devices 1 and 2 serving as cache group members and sends it to the terminal. In this sequence, the cache device that receives a content acquisition request (HTTP GET (URL)) specifying a URL sends a content acquisition request (HTTP GET (URL) Range: bytes=aa–bb) to the cache devices 1 and 2 that are thought to store a data block corresponding to the content based on calculating C mod N and determining whether V=m1, as described above, and retrieves the data block of the content (HTTP 206). The cache device A sends the retrieved content to the terminal (HTTP OK).

[Process T] is a processing sequence when the cache device A cannot retrieve the content data requested from the terminal from the cache devices 1 and 2 serving as the cache group members. In this sequence, the cache device that receives the content acquisition request (HTTP GET (URL)) specifying a URL sends the content acquisition request (HTTP GET (URL) Range: bytes=aa–bb) to the cache device 1 that is thought to store the data block corresponding to the content based on calculating C mod N and determining whether V=m1, as described above, and receives a response (HTTP 404 (Not Found) or HTTP 410 (Gone)) indicating that the data block of the content cannot be retrieved.

The cache device A sends the content acquisition request (HTTP GET (URL) Range: bytes=aa–bb) to the upstream cache device for the cache device A or the server, retrieves the data block of the content (HTTP 206), and sends the retrieved content (HTTP OK and the retrieved content data) to the terminal.

In the case where predetermined content cannot be retrieved from the cache group members as in [process T], the cache device cancels the group because it is meaningless for the cache device to stay as the cache group member. This process is [process U].

The cache A cancels the group by sending a notification for canceling the group (ICP_OP_NOTIFY) to the cache devices 1 and 2 composing the group. Subsequently, the cache devices A, 1, and 2 delete corresponding group information from a cache group table.

In the embodiment described above, the redirect sequence is described in the Hyper Text Transfer Protocol (HTTP). The redirect sequence also may be described in other protocols, such as the File Transfer Protocol (FTP) and the Real Time Streaming Protocol (RTSP). Moreover, the communication protocol between the cache devices is not limited to the ICP, but can be implemented by extending common communication processes between devices. Moreover, the communication protocol between the cache devices is not limited to the ICP.

A case where a group member m (m=1, 2, ..., N where N is the number of group members) composing a cache group withdraws from the cache group will now be described.

$S=(A+N-1)/N$ when $m \leq V$ and $S=A/N$ when $m>V$ under the condition that $V=N$ when A mod $N=0$ and $V=(A \bmod N)$ when A mod $N \neq 0$, where A is the total number of data blocks of content, for which a cache group is formed, and S is the number of data blocks (data blocks when V=m) that a cache device as a group member must store.

It is desirable that the cache device indefinitely store S data blocks. However, entries of some data blocks may be removed from a deletion pending list by repeating cache replacement under limited storage resources even when the cache device as the group member must store these data blocks. In a case where the entries of some data blocks are removed from the deletion pending list in this way, even when the cache device serving as the group member must store these data blocks, the following arrangement may be adopted. The ratio of remaining data blocks out of the data blocks that the cache device serving as the group member must store: $(S-D)/S \times 100(\%)$ is calculated, where D is the number of these data blocks to be deleted, which the cache device serving as the group member must normally store. When the relationship between the ratio of the remaining data blocks and a threshold value T (%) for a cache device to withdraw from a group is represented by the following expression:

$$(S-D)/S \times 100(\%) < T (0 \leq T < 100),$$

the cache device declares to other cache members composing the cache group concerning the target content that the cache device will withdraw from the group.

When the cache device detects withdrawal from the cache group, the cache device removes an entry corresponding to the target content from its own cache group table and sends the ICP_OP_NOTIFY message with a flag (0x10000000 (ICP_FLAG_GROUP_DESERTED), as an illustrative example) indicating this status on to all the group members composing the cache group concerning the target content, as shown in [process U] of FIG. 17.

Furthermore, a corresponding IP address in the cache group table of each of the notified cache devices is updated with 0.0.0.0 so that each of these cache devices recognizes that the cache device withdrew from the cache group.

In this case, other information, such as the number of members, may be stored as is so that the same algorithm as in a case where no member has withdrawn can be maintained. When a group member needs to access the data blocks normally stored in the group member that withdrew, the group member accesses the server storing the original data or the upstream cache device.

When the number of the members composing the cache group except the member that withdrew comes to one, the cache group cannot be maintained. Thus, to remove the group completely, an entry corresponding to the target content is removed from the cache group table of the only remaining cache device, and the fields Gp of entries in the deletion pending list, each of the entries pointing to each of data blocks belonging to the target content, are initialized (cleared to zero).

An embodiment in which a cache device includes multi-level deletion pending lists generated as data control lists will now be described.

In the embodiment described above, a cache device includes an LRU list, a free block list that indicates free area blocks in the cache, and a deletion pending list that is used for controlling data blocks temporarily set to a deletion pending status out of those data blocks to be subjected to deletion in the LRU list, as described above referring to FIG. 9. Each of these lists includes sequential entries.

Figure 18:
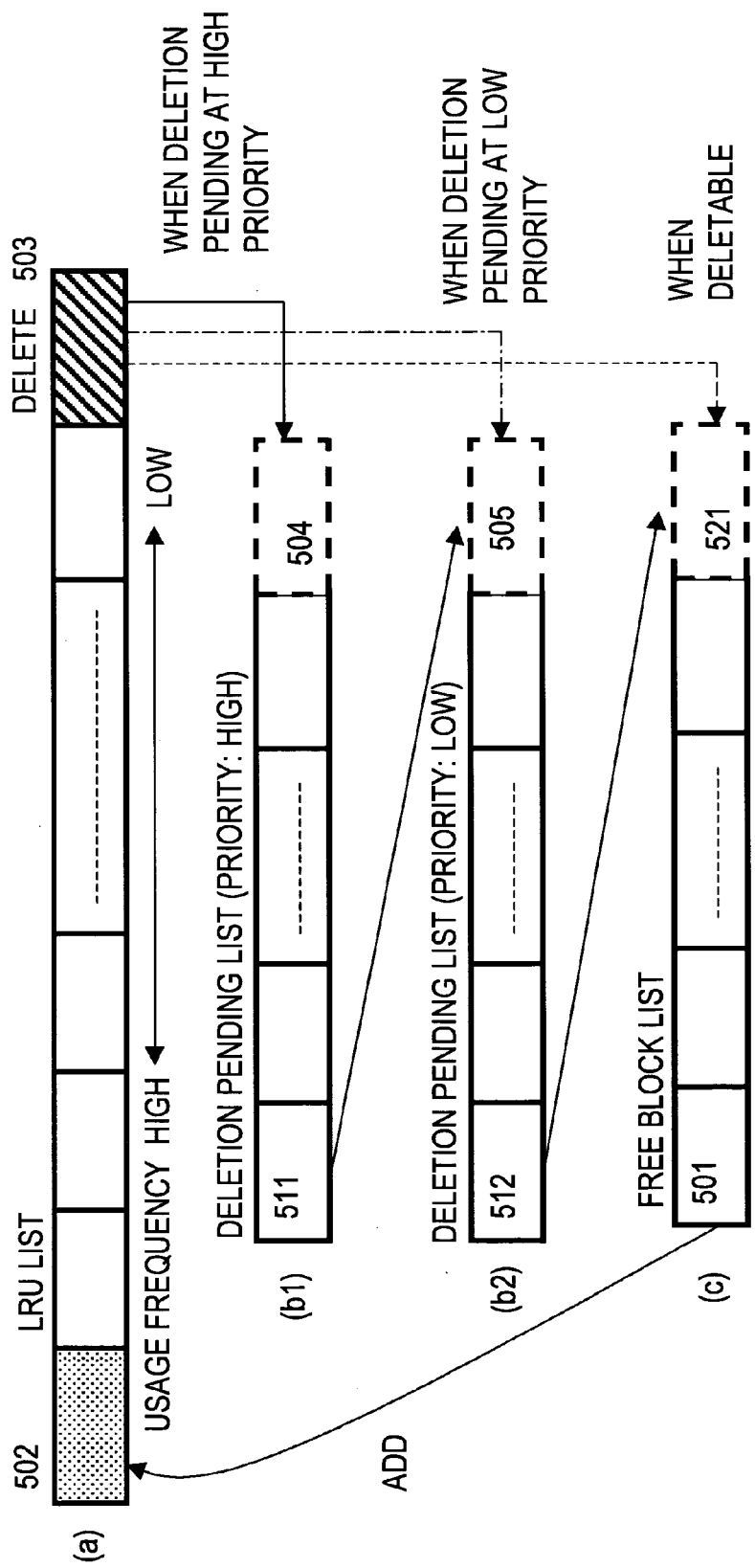
FIG. 18 illustrates a configuration including multi-level deletion pending lists in a cache device according to the present invention.

As shown in FIG. 18, a cache device according to this embodiment includes a number of deletion pending lists. The cache device includes an LRU list (a) having entries in the order of usage frequency, a number of deletion pending lists (b1) and (b2) including entries corresponding to respective content data blocks for which a cache group is formed, and a free block list (c) having pointer information of free area blocks.

The content data blocks are divided into two groups according to priority in storing the content data blocks and put in the deletion pending lists (b1) and (b2), respectively. In a case described below, the deletion pending list (b1) includes entries corresponding to content that is stored at high priority, and the deletion pending list (b2) includes entries corresponding to content that is stored at low priority. In this case, two deletion pending lists are set up. Alternatively, three or more deletion pending lists may be set up, according to priority, for storing the content data.

There are several ways of judging the priority in storing a data block according to the importance of the data block; for example, a data block corresponding to the last delivered content is judged to have a higher priority, or a data block at the head of content data or in a specific section after a scene change is judged to have a higher priority. The head of content data and a scene change can be detected with existing software.

Moving entries in the lists will now be described. For example, in a cache device, upon receiving a request for writing a new data block, the new data block is written to a data storage region, in the data storage area, corresponding to a data block pointer set in a leading entry 501 of the free block list (c), and information of the written data block is set in a leading entry 502 of the LRU list shown in FIG. 10.

When the length of the LRU list consequently exceeds an allowable length, an ending entry 503 of the LRU list is removed and a corresponding entry is put in the deletion pending list (b1) or (b2), or the free block list (c). Whether the corresponding entry is put in either of the deletion pending lists or the free block list is determined by judging whether the content data block corresponding to the entry is to be stored or deleted based on the value V from calculation of C mod N, as described above.

When it is determined that the ending entry 503 of the LRU list is to be removed and a corresponding entry is put in either of the deletion pending lists as a result of the above determination, according to priority in storing a data block, an entry corresponding to the data block having a high priority is put in the deletion pending list (b1) as an ending entry 504, and an entry corresponding to the data block having a low priority is put in the deletion pending list (b2) as an ending entry 505.

When the length of the deletion pending list (b1) exceeds a predetermined length upon adding a new entry to the deletion pending list (b1), an entry corresponding to a leading entry 511 of the deletion pending list (b1) is put in the deletion pending list (b2) as the ending entry 505.

Similarly, when the length of the deletion pending list (b2) exceeds a predetermined length upon adding a new entry to the deletion pending list (b2), an entry corresponding to a leading entry 512 of the deletion pending list (b2) is put in the free block list as an ending entry 521.

When the buffer capacity predetermined according to the free block list falls short upon storing new data, the buffer capacity is secured by removing an entry in the LRU list or the deletion pending list (b2) and putting a corresponding entry in the free block list; that is, by deleting a data block. A memory region pointed to by a data block pointer specified in the entry that is put in the free block list can be used for writing new input data, and current content of the data block is discarded.

Figure 19:
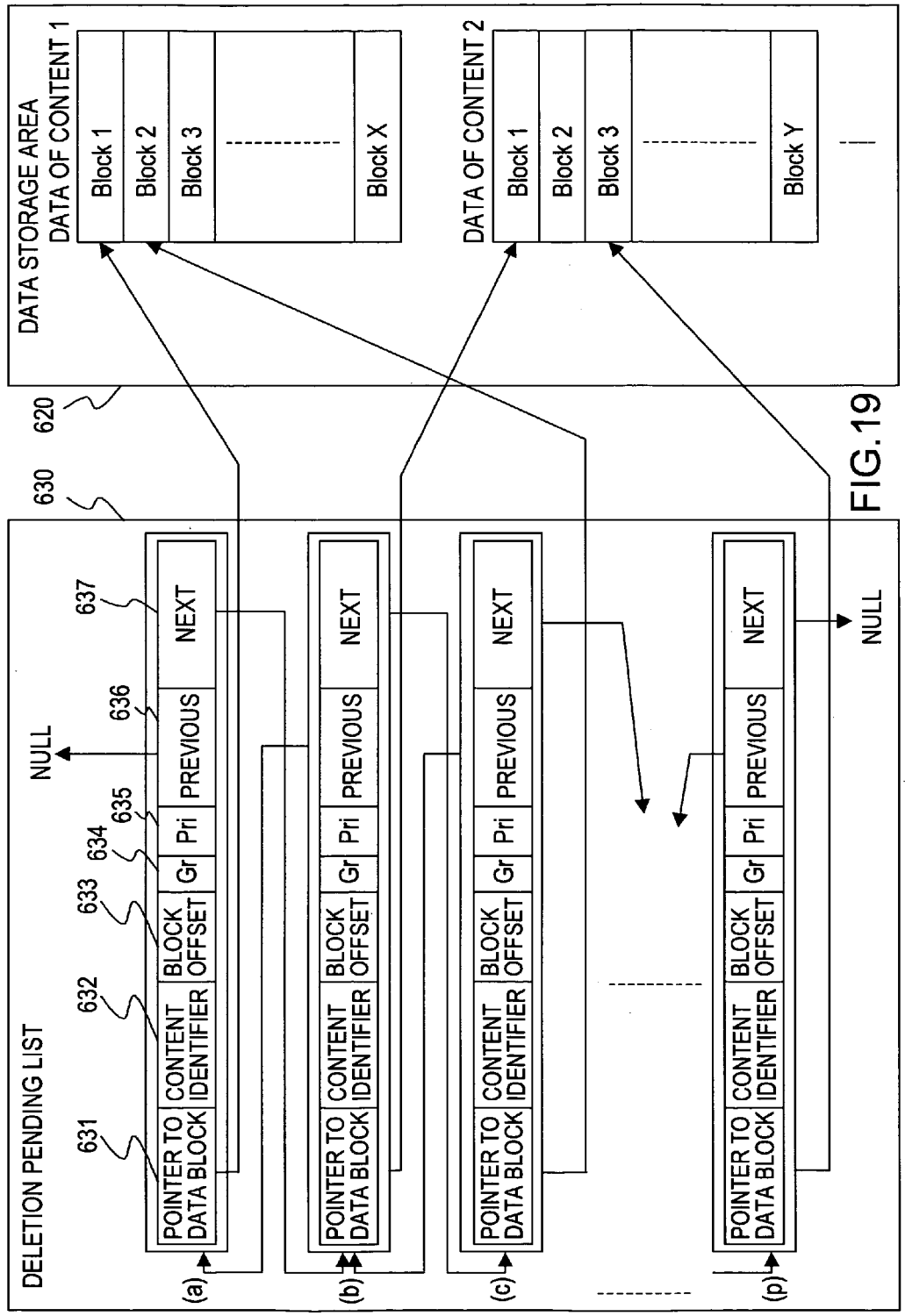
FIG. 19 illustrates a configuration including multi-level deletion pending lists in a cache device according to the present invention.

Referring to FIG. 19, the structure of each of the multi-level deletion pending lists will now be described. As described above, the deletion pending lists are used for controlling data blocks temporarily set to a deletion pending status out of those data blocks to be subjected to deletion in the LRU list.

FIG. 19 illustrates the structure of each of the deletion pending lists (b1) and (b2) shown in FIG. 18. As shown in FIG. 19, a deletion pending list 630 owned by a cache device is generated corresponding to data blocks set to a deletion pending status. List data records (entries) (a) to (p) are retained corresponding to respective data blocks set to the deletion pending status. FIG. 19 illustrates the internal structure of the deletion pending list, each entry of the deletion pending list including a pointer 631 pointing to a data block, a content identifier 632, a block offset 633, a group identifier (GP) 634 of a set-up cache group, a priority index (Priority) 635 of the deletion pending list, a pointer 636 pointing to a previous list data record (entry) in the same deletion pending list, and a pointer 637 pointing to a succeeding list data record (entry) in the same deletion pending list. That is, the multi-level deletion pending list 630 additionally includes the priority index (Priority) 635 of the deletion pending list.

Figure 20:
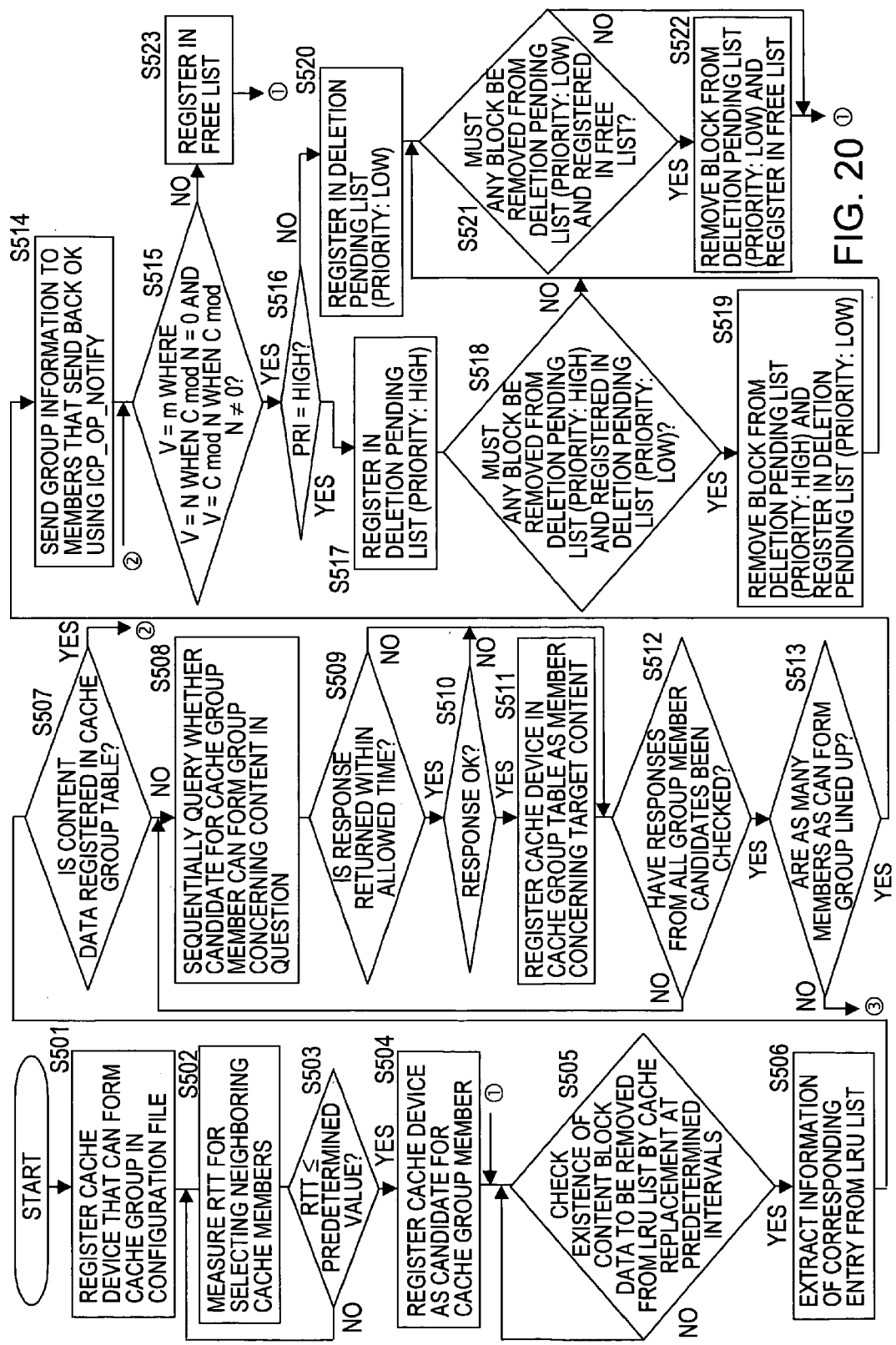
FIG. 20 is a flow chart illustrating group formation and data control in a cache device according to the present invention, the cache device including multi-level deletion pending lists.

Referring to FIG. 20, the process for generating a cache group and controlling data in a cache device including multi-level deletion pending lists will be described.

Steps S501 to S515 in FIG. 20 are the same as steps S101 to S115 of the processing flow in FIG. 13 as described above, and thus the description of these steps is omitted.

In step S515 in FIG. 20, each cache device carries out the following process concerning an entry to be removed from the LRU list, based on each value of the block offset number C, the number N of cache devices of a cache group, and the group member number m assigned to the cache device in the cache group: C mod N is calculated; V=N when C mod N=0, and V=(C mod N) when C mod N≠0; and whether V=m is judged. When V≠m, the cache device proceeds to step S523 where the data block is controlled in the free block list. When V=m, the data block is controlled in a deletion pending status in the cache device.

In the latter case, the priority in storing the data block to be set to a deletion pending status is determined in step S516. The priority is determined based on predetermined criteria; for example, a data block corresponding to the last delivered content is judged to have a higher priority, or a data block at the head of content data or in a specific section after a scene change is judged to have a higher priority.

When the data block is judged to be stored at high priority, the cache device proceeds to step S517 where a corresponding entry to the data block is put in the deletion pending list ((b1) in FIG. 18) for content that is stored at high priority. When the data block is judged to be stored at low priority, the cache device proceeds to step S520 where a corresponding entry to the data block is put in the deletion pending list ((b2) in FIG. 18) for content that is stored at low priority.

In step S518, the cache device judges whether it is required that an entry be removed from the deletion pending list for content that is stored at high priority and a corresponding entry is put in the deletion pending list for content that is stored at low priority. When the cache device judges that it is so required, in step S519, an entry is removed from the deletion pending list for content that is stored at high priority and a corresponding entry is put in the deletion pending list for content that is stored at low priority.

In step S521, the cache device judges whether it is required that an entry be removed from the deletion pending list for content that is stored at low priority and a corresponding entry is put in the free block list. When the cache device judges that it is so required, in step S522, an entry is removed from the deletion pending list for content that is stored at low priority and a corresponding entry is put in the free block list.

Data control using multi-level deletion pending lists is carried out in accordance with the process described above.

A typical hardware configuration of the cache device described in the above embodiment will now be described.

Figure 21:
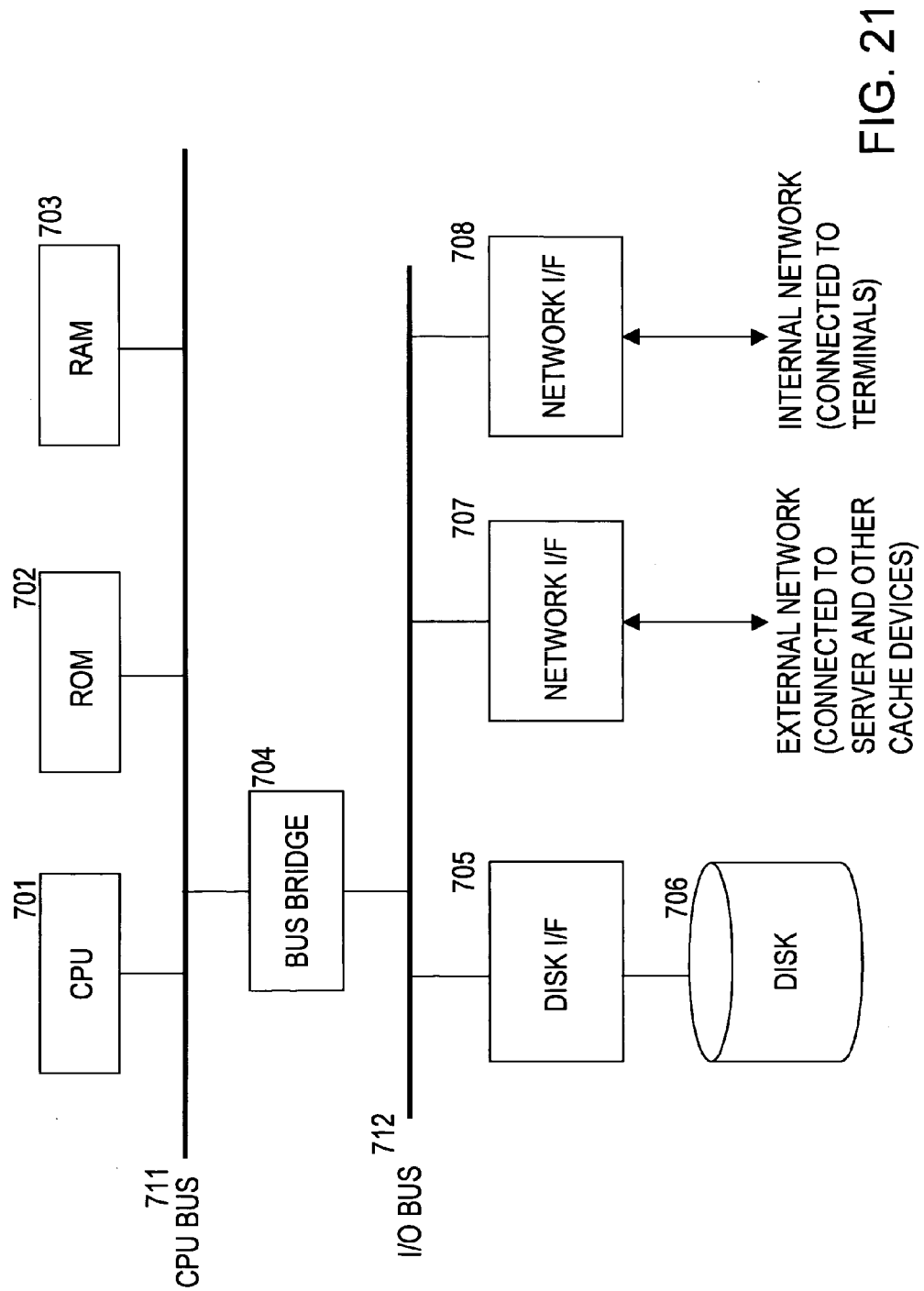
FIG. 21 illustrates a typical hardware configuration of a cache device according to the present invention.

FIG. 21 illustrates a cache device including a central processing unit (CPU) serving as controller. The configuration shown in FIG. 21 is just for illustrative purposes, and the cache device may have a hardware configuration other than the configuration that will now be described.

The configuration shown in FIG. 21 will now be described. A CPU 701 is a processor that runs a variety of programs and operating systems (OS). A read-only-memory (ROM) 702 stores programs run by the CPU 701, and fixed data serving as parameters for calculation. A random-access-memory (RAM) 703 is used as a storage area and a work area for programs run by the CPU 701 and parameters changing in executing programs, and as a storage area for a neighboring cache device list and a cache group table.

The CPU 701, the ROM 702, and the RAM 703 are connected to a CPU bus 711 through which data can be transferred, and are connected to an input/output (I/O) bus 712 through a bus bridge 704. A disk interface 705 and network interfaces 707 and 708 are connected to the I/O bus 712.

The disk interface 705 serves as an interface for disks 706, such as a hard disk, a flexible disk, a compact disc (CD) ROM, a digital versatile disc (DVD), and a magnetic disk. The disks 706 store cached data. Necessary data is retrieved from and stored in the disks 706 under the control of the CPU 701.

The network interface 707 serves as an external network interface for sending and receiving data to and from servers connected to networks and other cache devices. The network interface 708 serves as an internal network interface for sending and receiving data to and from terminals connected to networks.

Processes described in the description can be carried out with hardware, software, or software in combination with hardware. When a sequence of processes is carried out with software, programs composing the software are distributed to computers including dedicated hardware into which the programs are built, general-purpose personal computers on which a variety of programs performing a variety of functions are installed, and the like in the following ways. The programs may be stored in recording media from which the programs can be read, such as a flexible disk and a CD-ROM, and distributed to these computers, or the programs may be downloaded to these computers through networks, such as the Internet.

Specifically, the programs may be stored in a hard disk or a ROM serving as recording media, in advance. Alternatively, the programs may be temporarily or permanently stored (recorded) in removable recording media, such as a flexible disk, a CD-ROM, a magnetic optical (MO) disk, a DVD, a magnetic disk, or a semiconductor memory. Such removable recording media can be provided as so-called packaged software.

The programs may be installed in computers from the removable recording media as described above. Alternatively, the programs may be transferred from download sites to computers either wirelessly or through networks, such as local area networks (LAN) and the Internet. The transferred programs can be installed in recording media, such as a built-in hard disk, in the computers that receive the programs.

A variety of processes described in the description may be chronologically carried out in the order of the description, or alternatively may be carried out in parallel or individually depending on the processing capacity of devices that carry out the processes or according to need. The term "system" referred to in the description refers to a number of devices that are logically combined, with the devices not necessarily being housed in the same housing.

According to the system of the present invention, when cache replacement is carried out in cache devices connected to each other through a network, data control is carried out so that data blocks set to a deletion pending status in each cache device, which includes lists regarding the data blocks set to a deletion pending status, in a cache group are different from those in other cache devices in the cache group, as described above. Thus, a storage area can be used efficiently as compared with a case where each cache independently controls cache replacement, and data blocks stored in a number of cache devices are collected to be sent to terminals in response to data acquisition requests from the terminals, thereby facilitating network traffic and improving the hit rate of the cache devices.

Moreover, when cache devices include multi-level deletion pending lists according to the present invention, the possibility that data stored at high priority is not deleted but remains is high, thereby achieving further improvement in the cache hit ratio.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A first cache device for storing data received through a network as cached data and for retrieving the cached data in response to a data request from a terminal to send the cached data to the terminal, the first cache device comprising:

a first data area for storing data;

a second data area for storing a cache group table including group configuration information regarding a cache group including first data associated with the first cache device, second data associated with one or more additional cache devices, wherein the additional cache devices are connected to the same network as the first cache device and the additional cache devices are members of the cache group, and including identifying data associated with content data being controlled by the cache group;

a controller for determining which data blocks are in a deletion pending status, the data blocks being data stored in the first cache device, the data blocks being associated with the content data being controlled by the cache group, and for controlling a status of the data blocks in the deletion pending status according to a deletion pending list including entries having information corresponding to the data blocks in the deletion pending status.

2. A cache device as claimed in claim 1, wherein:

the cache group table includes an identifier of content that is collaboratively controlled by the cache group, a number N of cache devices of the cache group, and group member numbers m assigned to respective cache devices;

the controller determines which data blocks are in a deletion pending status, the data blocks being stored in the cache device, out of the data blocks composing the content, which is collaboratively controlled; and the controller carries out a calculation based on a block offset number C serving as offset information, of a data block subjected to the determination, from a leading data block of the content to which the data block belongs:

C mod N is calculated;

V=N when C mod N =0, and

V=(C mod N) when C mod N≠0; and whether V=m is judged, and the respective data block is judged to be one of the data blocks in the deletion pending status when V=m.

3. A cache device as claimed in claim 2, wherein when the data request from the terminal is for acquiring a data block contained in the content that is collaboratively controlled by the cache group, the controller judges which cache device of the cache group stores the requested data block and retrieves the data block from the cache device itself or from the additional cache devices of the cache group according to the judgment.

4. A cache device as claimed in claim 3, wherein the cache group table includes an identifier of the content that is collaboratively controlled by the cache group, a number N of cache devices of the cache group, and group member numbers m assigned to respective cache devices, and the controller carries out a following calculation based on a block offset number C serving as offset information, of the requested data block, from the leading data block of the content to which the data block belongs:

C mod N is calculated;

V=N when C mod N =0, and

V=(C mod N) when C mod N≠0; and

V=m, and the data block is retrieved from a cache device having the group member number m that is calculated.

5. A cache device as claimed in claim 1, wherein:

the controller judges, by exchanging messages between the cache devices, whether collaborative control by the cache group is applicable to a data block corresponding to an entry to be removed from an LRU list serving as a list for controlling data blocks stored in storage areas; and the controller generates the cache group table upon judging that the collaborative control is applicable.

6. A cache device as claimed in claim 1, wherein, for a data block corresponding to an entry to be removed from an LRU list serving as a list for controlling data blocks stored in storage areas, the controller determines which data blocks are in a deletion pending status, the data blocks being data stored in the cache device, from a list of data blocks associated with the content data being controlled by the cache group based on the information included in the cache group table, and the controller controls the data block that is not in the deletion pending status, in a free block list serving as a list for controlling data blocks that can be deleted.

7. A cache device as claimed in claim 1, wherein the deletion pending list is a multi-level deletion pending list where each level corresponds to a priority, the data blocks being stored in order of the priority, and the controller performs a judgment to determine the priority at which each of the data blocks is stored, and registers an entry corresponding to each of the data blocks in one level of the multi-level deletion pending lists according to the judgment.

8. A method for controlling cached data in a cache device for storing data received through a network as the cached data and retrieving the cached data in response to a data request from a terminal to send the cached data to the terminal, the method comprising:

storing data blocks:

determining which data blocks are in a deletion pending status, the data blocks being data stored in the cache device and associated with content data, the content data being controlled by a cache group, wherein a cache group table stores configuration information associated with the cache group, the cache group including the first cache device and one or more additional cache devices, the additional cache devices being connected to the same network, including identifying data associated with content data being controlled by the cache group;

controlling a status of the data blocks in the deletion pending status according to a deletion pending list including entries having information corresponding to the data blocks in the deletion pending status;

receiving a request for data; and transmitting the data.

9. A method for controlling cached data as claimed in claim 8, wherein:

the cache group table includes an identifier of the content that is collaboratively controlled by the cache group, a number N of cache devices of the cache group, and group member numbers m assigned to respective cache devices;

in the step of determining which data blocks are in a deletion pending status, the data blocks in the deletion pending status, the data blocks being stored in the cache device, are determined out of the data blocks including the content, which is collaboratively controlled; and a calculation is carried out based on a block offset number C serving as offset information, of a data block subjected to the determination, from a leading data block of the content to which the data block belongs:

C mod N is calculated;
V=N when C mod N=0, and
V=(C mod N) when C mod N≠0 and
whether V=m is judged, and
the respective data block is judged to be one of the data blocks in the deletion pending status when V=m.

10. A method for controlling cached data as claimed in claim 9, further comprising:
judging which cache device of the cache group stores the requested data block; and
retrieving the data block from the cache device itself or the additional cache devices of the cache group according to the judgment when the data request from the terminal is for acquiring a data block contained in the content that is collaboratively controlled by the cache group.

11. A method for controlling cached data as claimed in claim 10, wherein: the cache group table includes an identifier of the content that is collaboratively controlled by the cache group, the number N of cache devices of the cache group, and group member numbers m assigned to respective cache devices; and
in the step of retrieving the data block, a calculation is carried out based on a block offset number C serving as offset information, of the requested data block, from the leading data block of the content to which the data block belongs:
C mod N is calculated;
V=N when C mod N =0, and
V=(C mod N) when C mod N≠0; and
V=m, and
the data block is retrieved from a cache device having the group member number m that is calculated.

12. A method for controlling cached data as claimed in claim 8, further comprising:
judging, by exchanging messages between the cache devices, whether collaborative control by the cache group is applicable to a data block corresponding to an entry to be removed from an LRU list serving as a list for controlling data blocks stored in storage areas; and
generating the cache group table upon judging that the collaborative control is applicable.

13. A method for controlling cached data as claimed in claim 8, further comprising:
determining which data blocks are in a deletion pending status, the data blocks being data stored in the cache device, from a list of data blocks associated with the content data being controlled by the cache group based on the information included in the cache group table for a data block corresponding to an entry to be removed from an LRU list serving as a list for controlling data blocks stored in storage areas; and
controlling the data block, that is not in the deletion pending status, in a free block list serving as a list for controlling data blocks that can be deleted.

14. A method for controlling cached data as claimed in claim 8, wherein the deletion pending list is a multi-level deletion pending list where each level corresponds to a priority, the data blocks being stored in order of the priority, and the controller performs a judgment to determine the priority at which each of the data blocks is stored, and registers an entry corresponding to each of the data blocks in one level of the multi-level deletion pending list according to the judgment.

* * * * *